United States Patent
Zhang et al.

(10) Patent No.: US 12,445,228 B2
(45) Date of Patent: Oct. 14, 2025

(54) METHOD AND APPARATUS FOR HYBRID AUTOMATIC REPEAT REQUEST-ACKNOWLEDGEMENT RETRANSMISSION

(71) Applicant: Samsung Electronics Co., Ltd., Gyeonggi-do (KR)

(72) Inventors: Sa Zhang, Beijing (CN); Feifei Sun, Beijing (CN); Jingxing Fu, Beijing (CN)

(73) Assignee: Samsung Electronics Co., Ltd., Seoul (KR)

( * ) Notice: Subject to any disclaimer, the term of this patent is extended or adjusted under 35 U.S.C. 154(b) by 326 days.

(21) Appl. No.: 17/952,792

(22) Filed: Sep. 26, 2022

(65) Prior Publication Data

US 2023/0095598 A1   Mar. 30, 2023

(30) Foreign Application Priority Data

Sep. 26, 2021   (CN) ............................ 202111131253.9
Mar. 8, 2022    (CN) ............................ 202210219501.3

(51) Int. Cl.
*H04L 1/18*    (2023.01)
*H04L 1/00*    (2006.01)
(Continued)

(52) U.S. Cl.
CPC .......... *H04L 1/1812* (2013.01); *H04L 1/0004* (2013.01); *H04L 1/0061* (2013.01); *H04L 1/08* (2013.01)

(58) Field of Classification Search
CPC ... H04W 28/04; H04W 72/04; H04W 72/042; H04W 88/08; H04L 5/0007; H04L 1/1812; H04L 1/0004; H04L 1/0061; H04L 1/08
(Continued)

(56) References Cited

U.S. PATENT DOCUMENTS 11,711,172 B1 *   7/2023   Dimou .................. H04L 1/1812
                                                              370/329
2019/0357190 A1   11/2019  Park et al.
(Continued)

FOREIGN PATENT DOCUMENTS

WO   WO 2016/119232         8/2016
WO   WO 2016/119232 A1 *    8/2016   ............... H04L 1/00
(Continued)

OTHER PUBLICATIONS

3GPP TSG RAN WG1 #102-e, e-Meeting, Aug. 17-28, 2020, R1-2006212, Source: CMCC, Title: Enhancements on HARQ for NTN, Agenda Item: 8.4.3. (Year: 2020).*
(Continued)

*Primary Examiner* — Peter G Solinsky
*Assistant Examiner* — Sanjay K Dewan
(74) *Attorney, Agent, or Firm* — The Farrell Law Firm, P.C.

(57) ABSTRACT

Methods and apparatuses are provided in a wireless communication system. Configuration information regarding a hybrid automatic repeat and request-acknowledgement (HARQ-ACK) retransmission is received from a base station (BS) via higher layer signaling. Downlink control information (DCI) is received from the BS. An offset for the HARQ-ACK retransmission is identified as a value of a modulation and coding scheme (MCS) field included in the DCI, based on the configuration information. The HARQ-ACK retransmission is performed on a slot identified based on the offset.

16 Claims, 24 Drawing Sheets

(51) Int. Cl.
*H04L 1/08* (2006.01)
*H04L 1/1812* (2023.01)

(58) Field of Classification Search
USPC .................................................... 370/329
See application file for complete search history.

(56) References Cited

U.S. PATENT DOCUMENTS

| | | | | |
|---|---|---|---|---|
| 2020/0092044 A1* | 3/2020 | Park | .................. | H04L 1/189 |
| 2021/0242977 A1* | 8/2021 | Khoshnevisan | ...... | H04L 1/0031 |
| 2023/0224095 A1* | 7/2023 | Bae | .................. | H04L 1/1854 |
| | | | | 370/329 |
| 2023/0261807 A1* | 8/2023 | Bae | .................. | H04W 72/23 |
| | | | | 370/329 |
| 2023/0300816 A1* | 9/2023 | Guo | .................. | H04W 72/11 |
| | | | | 370/329 |
| 2023/0328727 A1* | 10/2023 | Salah | .................. | H04L 5/0055 |
| | | | | 370/329 |

FOREIGN PATENT DOCUMENTS

| | | | | |
|---|---|---|---|---|
| WO | WO 2016/163709 | | 10/2016 | |
| WO | WO 2016/163709 A1 * | 10/2016 | ............ | H04W 72/23 |
| WO | WO 2018/175446 | | 9/2018 | |
| WO | WO 2018/175446 A1 * | 9/2018 | ............... | H04L 1/18 |
| WO | WO 2020/034533 | | 2/2020 | |
| WO | WO 2020/034533 A1 * | 2/2020 | ............... | H04L 1/16 |

OTHER PUBLICATIONS

CMCC, "Enhancements on HARQ for NTN", R1-2006212, 3GPP TSG RAN WG1 #102-e, Aug. 17-28, 2020, 5 pages.
European Search Report dated Aug. 28, 2024 issued in counterpart application No. 22873224.4-1206, 12 pages.
Korean Office Action dated Dec. 30, 2022 issued in counterpart application No. PCT/KR2022/014345, 9 pages.

* cited by examiner

METHOD AND APPARATUS FOR HYBRID AUTOMATIC REPEAT REQUEST-ACKNOWLEDGEMENT RETRANSMISSION

CROSS-REFERENCE TO RELATED APPLICATION(S)

This application is based on and claims priority under 35 U.S.C. 119(a) to Chinese Patent Application Nos. 202111131253.9 and 202210219501.3, filed in the Chinese Patent Office on Sep. 26, 2021 and Mar. 8, 2022, respectively, the contents of which are incorporated herein by reference.

BACKGROUND

1. Field

The disclosure relates generally to wireless communication, and more particularly, to a method and an apparatus for hybrid automatic repeat request-acknowledgement (HARQ-ACK) retransmission.

2. Description of the Related Art

Fifth generation (5G) mobile communication technologies define broad frequency bands such that high transmission rates and new services are possible and can be implemented not only in "Sub 6 GHz" bands, such as 3.5 GHz, but also in "above 6 GHz" bands, also referred to as mmWave including 28 GHz and 39 GHz. Additionally, it has been considered to implement sixth generation (6G) mobile communication technologies (also referred to as beyond 5G systems) in terahertz bands (e.g., 95 GHz to 3 THz bands) in order to achieve transmission rates that are fifty times faster than 5G mobile communication technologies and ultra-low latencies that are one-tenth of 5G mobile communication technologies.

Upon developing 5G mobile communication technologies, in order to support services and to satisfy performance requirements in connection with enhanced mobile broadband (eMBB), ultra-reliable low latency (URLLC), and massive machine-type communications (mMTC), there has been ongoing standardization regarding beamforming and massive multiple input-multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for a large amount of data transmission and a polar code for highly reliable transmission of control information, L2 pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio-unlicensed (NR-U) aimed at system operations conforming to various regulation-related requirements in unlicensed bands, new radio (NR) user equipment (UE) Power Saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (i.e., 2-step random access channel (RACH) for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the increasing number of connected devices will be connected to communication networks, and it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Further, such development of 5G mobile communication systems will serve as a basis for developing not only new waveforms for providing coverage in terahertz bands of 6G mobile communication technologies, multi-antenna transmission technologies such as full dimensional-MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, artificial intelligence (AI)-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

This disclosure relates to reducing the size of the downlink control information (DCI) format, thereby improving the spectrum efficiency and reducing the implementation complexity of the UE.

In addition, this disclosure relates to clarifying the behavior of the UE, ensuring the consistency of the understanding of the triggering between the UE and the base station, and improving the reliability of the HARQ-ACK transmission.

According to an aspect, a method performed by a UE in a wireless communication system is provided. Configuration information regarding a HARQ-ACK retransmission is received from a base station (BS) via higher layer signaling. DCI is received from the BS. An offset for the HARQ-ACK retransmission is identified as a value of a modulation and coding scheme (MCS) field included in the DCI, based on the configuration information. The HARQ-ACK retransmission is performed on a slot identified based on the offset.

According to an aspect, a method performed by a BS in a wireless communication system is provided. Configuration information regarding a HARQ-ACK is transmitted to a UE retransmission via higher layer signaling. DCI is transmitted to the UE. An offset for the HARQ-ACK retransmission is identified as value of an MCS field included in the DCI, based on the configuration information. The HARQ-ACK retransmission is received on a slot identified based on the offset.

According to an aspect, a UE in wireless communication system is provided. The UE includes a transceiver and a processor coupled with the transceiver. The processor is configured to receive, from a BS, configuration information regarding a HARQ-ACK retransmission via higher layer signaling, and receive DCI from the BS. The processor is also configured to identify an offset for the HARQ-ACK retransmission as value of an MCS field included in the DCI, based on the configuration information, and perform the HARQ-ACK retransmission on a slot identified based on the offset.

According to an aspect, a BS in a wireless communication system is provided. The BS includes a transceiver and a processor coupled with the transceiver. The processor is configured to transmit, to a UE, configuration information regarding a HARQ-ACK retransmission via higher layer signaling, and transmit DCI to the UE. The processor is also configured to identify an offset for the HARQ-ACK retransmission as value of an MCS field included in the DCI, based on the configuration information, and receive the HARQ-ACK retransmission on a slot identified based on the offset.

BRIEF DESCRIPTION OF THE DRAWINGS

The above and other aspects, features, and advantages of the disclosure will be more apparent from the following detailed description when taken in conjunction with the accompanying drawings, in which.

DETAILED DESCRIPTION

Figure 1:
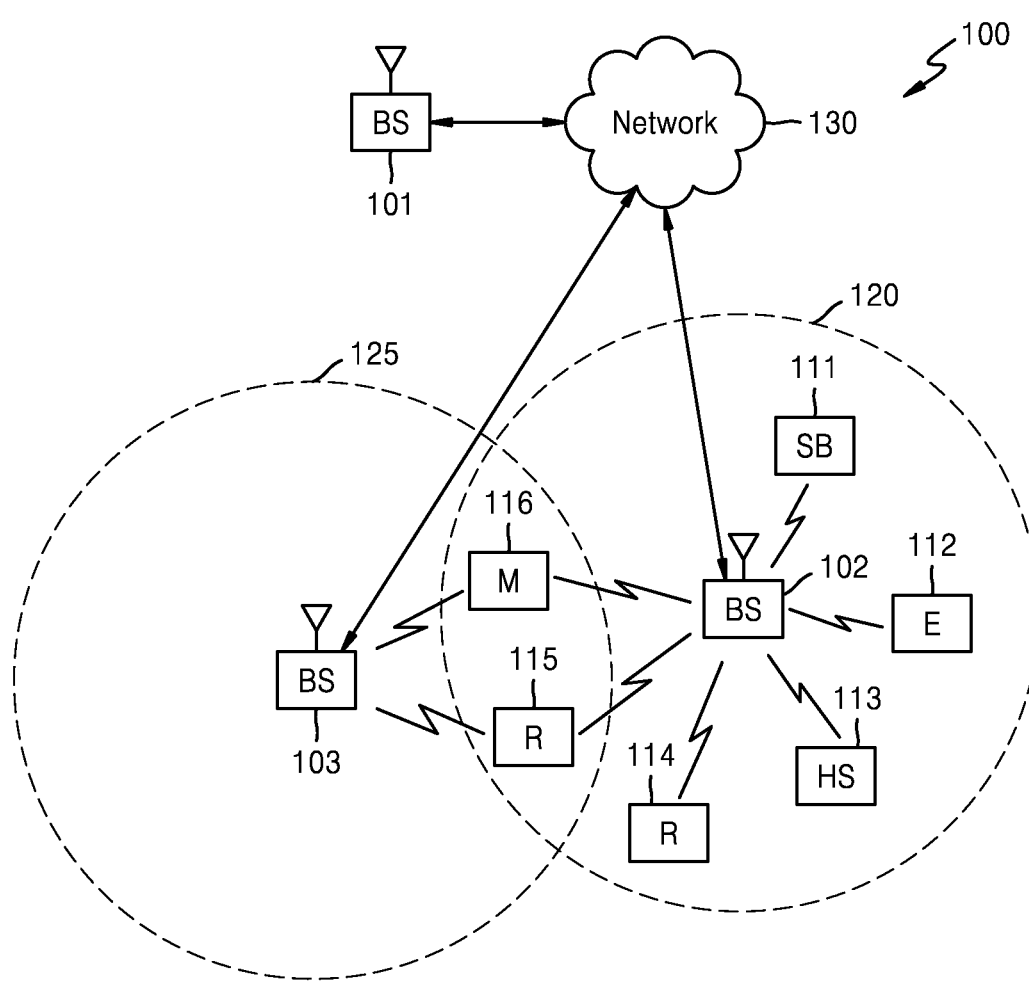
FIG. 1 is a diagram illustrating a schematic diagram of a wireless network, according to an embodiment.

Embodiments of the disclosure are described in detail with reference to the accompanying drawings. The same or similar components may be designated by the same or similar reference numerals although they are illustrated in different drawings. Detailed description of constructions or processes known in the art may be omitted to avoid obscuring the subject matter of the disclosure.

Definitions of certain words and phrases used herein are set forth below. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A, B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein are not intended to limit and/or define the scope of the present disclosure. For example, unless otherwise defined, the technical terms or scientific terms used in the disclosure shall have the ordinary meaning understood by those with ordinary skills in the art to which the present disclosure belongs.

It should be understood that "first", "second" and similar words used herein do not express any order, quantity or importance, but are only used to distinguish different components. Similar words such as singular forms "a", "an" or "the" do not express a limitation of quantity, but express the existence of at least one of the referenced item, unless the context clearly dictates otherwise. For example, reference to "a component surface" includes reference to one or more of such surfaces.

As used herein, any reference to "an example" or "example", "an implementation" or "implementation", "an embodiment" or "embodiment" means that particular elements, features, structures or characteristics described in connection with the embodiment is included in at least one embodiment. The phrases "in one embodiment" or "in one example" appearing in different places in the specification do not necessarily refer to the same embodiment.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "set" means one or more. Accordingly, a set of items can be a single item or a collection of two or more items.

In this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versa), etc.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

Embodiments of the disclosure are for illustration only and should not be interpreted as limiting the scope of the disclosure in any way. Those skilled in the art will understand that the principles of the disclosure can be implemented in any suitably arranged wireless communication system. For example, although the disclosure is directed to long term evolution (LTE) and/or 5G communication systems, those skilled in the art will understand that the main points of the disclosure can also be applied to other communication systems with similar technical backgrounds and channel formats with slight modifications without departing from the scope of the disclosure. The technical schemes of the embodiments of the present application can be applied to various communication systems, and for example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5G systems or NR systems, etc. Additionally, the technical schemes of the embodiments can be applied to future-oriented communication technologies. In addition, the technical schemes of the embodiments of the present application can be applied to future-oriented communication technologies.

FIG. 1-FIG. 3B describe embodiments implemented by using orthogonal frequency division multiplexing (OFDM) or orthogonal frequency division multiple access (OFDMA) communication technologies in wireless communication systems. The descriptions of FIG. 1-FIG. 3B do not refer to physical or architectural implications for the manner in which different embodiments may be implemented. Different embodiments of the disclosure may be implemented in any suitably arranged communication systems.

FIG. 1 is a diagram illustrating a wireless network, according to an embodiment. A wireless network 100 shown in FIG. 1 is for illustration purposes only. Other embodiments of the wireless network 100 can be used without departing from the scope of the disclosure.

The wireless network 100 includes a first gNodeB (gNB) 101, a second gNB 102, and a third gNB 103. The first gNB 101 communicates with the second gNB 102 and the third gNB 103. The first gNB 101 also communicates with at least one Internet protocol (IP) network 130, such as the Internet, a private IP network, or other data networks.

Depending on a type of the network, other well-known terms such as "base station (BS)" or "access point" can be used instead of "gNodeB" or "gNB". For convenience, the terms "gNodeB" and "gNB" are used herein to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For example, the terms "terminal", "user equipment" and "UE" may be used herein to refer to remote wireless devices that wirelessly access the gNB, no matter whether the UE is a mobile device (such as a mobile phone or a smart phone) or a fixed device (such as a desktop computer or a vending machine).

The second gNB 102 provides wireless broadband access to a network 130 for a first plurality of UEs within a coverage area 120 of the second gNB 102. The first plurality of UEs includes a first UE 111, which may be located in a small business (SB); a second UE 112, which may be located in an enterprise (E); a third UE 113, which may be located in a WiFi hotspot (HS); a fourth UE 114, which may be located in a first residence (R); a fifth UE 115, which may be located in a second residence (R); a sixth UE 116, which may be a mobile device (M), such as a cellular phone, a wireless laptop computer, a wireless personal digital assistant (PDA), etc. The third gNB 103 provides wireless broadband access to the network 130 for a second plurality of UEs within a coverage area 125 of the third gNB 103. The second plurality of UEs includes the fifth UE 115 and the sixth UE 116. One or more of the gNBs 101-103 can communicate with each other and with the UEs 111-116 using 5G, LTE, LTE-advanced (LTE-A), WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of the first gNB 101, the second gNB 102, and the third gNB 103 include a 2D antenna array as described in embodiments of the disclosure. One or more of the first gNB 101, the second gNB 102, and the third gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the first gNB 101 can directly communicate with any number of UEs and provide wireless broadband access to the network 130 for those UEs. Similarly, each of the second and third gNBs 102-103 can directly communicate with the network 130 and provide direct wireless broadband access to the network 130 for the UEs. In addition, the gNBs 101, 102 and/or 103 can provide access to other or additional external networks, such as external telephone networks or other types of data networks.

Figure 2A:
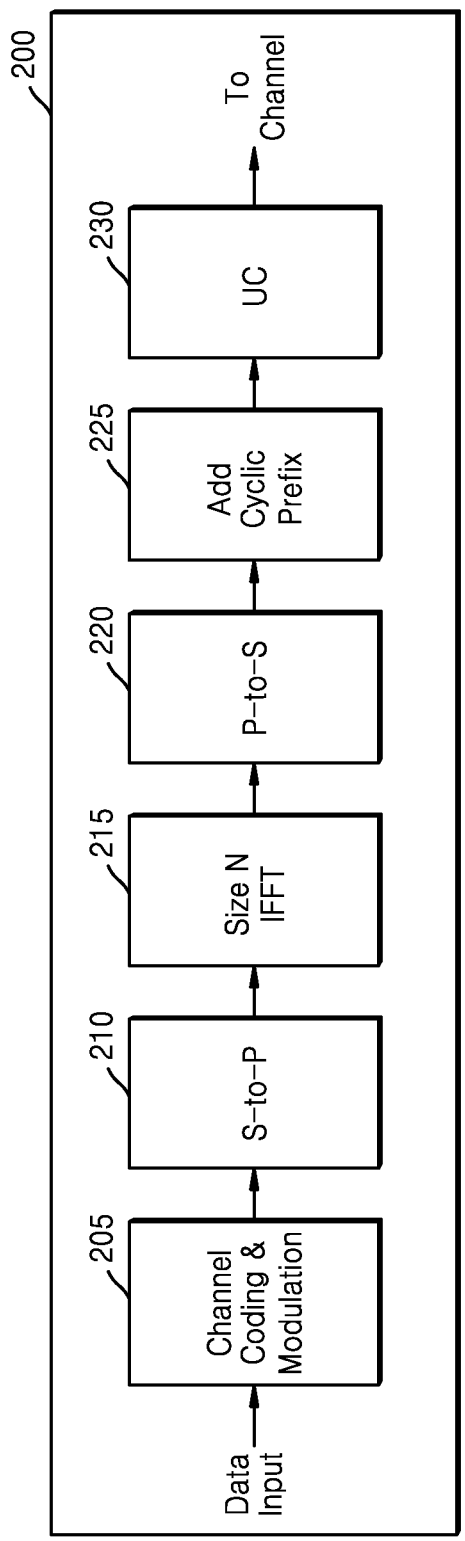
FIGS. 2A and 2B are diagrams illustrating wireless transmission and reception paths, according to an embodiment.
Figure 2B:
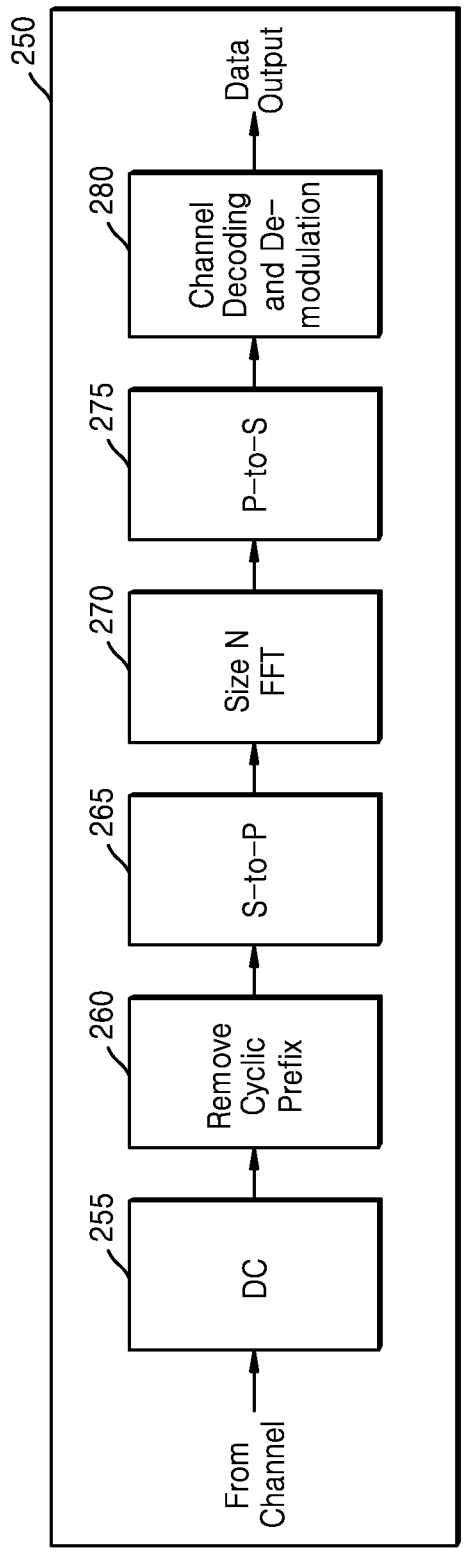

FIGS. 2A and 2B are diagrams illustrating wireless transmission and reception paths, according to an embodiment. A transmission path 200 can be described as being implemented in a gNB, such as the second gNB 102, and a reception path 250 can be described as being implemented in a UE, such as the sixth UE 116. However, it should be understood that the reception path 250 can be implemented in a gNB and the transmission path 200 can be implemented in a UE. The reception path 250 may be configured to support codebook designs and structures for systems with 2D antenna arrays.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (e.g., LDPC coding), and modulates the input bits (e.g., using quadrature phase shift keying (QPSK) or quadrature amplitude modulation (QAM)) to generate a sequence of frequency-domain modulated symbols. The serial-to-parallel (S-to-P) block 210 converts (e.g., demultiplexes) serial modulated symbols into parallel data to generate N parallel symbol streams, where N is a size of the IFFT/FFT used in the second gNB 102 and the sixth UE 116. The size N IFFT block 215 performs IFFT operations on the N parallel symbol streams to generate a time domain output signal. The parallel-to-serial block 220 converts (e.g., multiplexes) parallel time domain output symbols from the Size N IFFT block 215 to generate a serial time domain signal. The cyclic prefix addition block 225 inserts a cyclic prefix into the time domain signal. The up-converter 230 modulates (e.g., up-converts) the output of the cyclic prefix addition block 225 to an RF frequency for transmission via a wireless channel. The signal can also be filtered at a baseband before switching to the RF frequency.

The RF signal transmitted from the second gNB 102 arrives at the sixth UE 116 after passing through the wireless channel, and operations in reverse to those at the second gNB 102 are performed at the sixth UE 116. The down-converter 255 down-converts the received signal to a baseband frequency, and the cyclic prefix removal block 260 removes the cyclic prefix to generate a serial time domain baseband signal. The serial-to-parallel block 265 converts the time domain baseband signal into a parallel time domain signal. The Size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of the gNBs 101-103 may implement the transmission path 200 similar to that for transmitting to the UEs 111-116 in the downlink, and may implement the reception path 250 similar to that for receiving from the UEs 111-116 in the uplink. Similarly, each of the UEs 111-116 may implement the transmission path 200 for transmitting to the gNBs 101-103 in the uplink, and may implement the reception path 250 for receiving from the gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
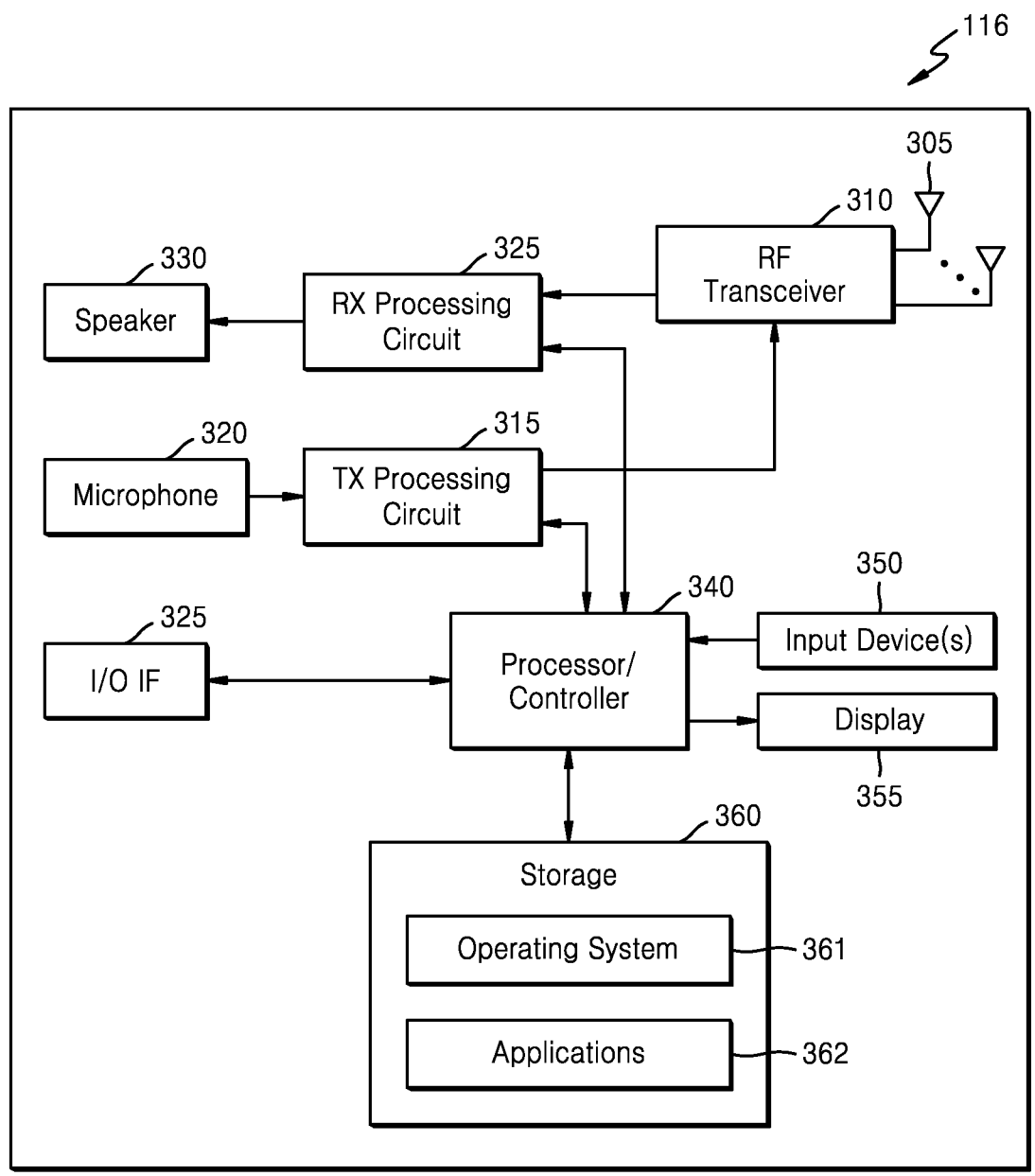
FIG. 3A is a diagram illustrating a UE, according to an embodiment.

FIG. 3A is a diagram illustrating a UE, according to an embodiment. The sixth UE 116 is shown in FIG. 3A for illustration only, and the UEs 111-115 of FIG. 1 can have the same or similar configuration. However, a UE has various configurations, and FIG. 3A does not limit the scope of the disclosure to any specific implementation of the UE.

The sixth UE 116 includes an antenna 305, a radio frequency (RF) transceiver 310, a transmission (TX) processing circuit 315, a microphone 320, and a reception (RX) processing circuit 325. The sixth UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to the processor/controller 340 for further processing (such as for web browsing data).

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of the sixth UE 116. For example, the processor/controller 340 can control the reception of forward channel signals and the transmission of backward channel signals through the RF transceiver 310, the RX processing circuit 325 and the TX processing circuit 315 according to well-known principles. The processor/controller 340 may include at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. The processor/controller 340 may be configured to execute the application 362 based on the OS 361 or in response to signals received from the gNB or the operator. The processor/controller 340 is also coupled to an I/O interface 345, where the I/O interface 345 provides the sixth UE 116 with the ability to connect to other devices such as laptop computers and handheld computers. The I/O interface 345 is a communication path between these accessories and the processor/controller 340.

The processor/controller 340 is also coupled to the input device(s) 350 and the display 355. An operator of the sixth UE 116 can input data into the sixth UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of the sixth UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the sixth UE 116 is configured as a mobile phone or a smart phone, UEs can be configured to operate as other types of mobile or fixed devices.

Figure 3B:
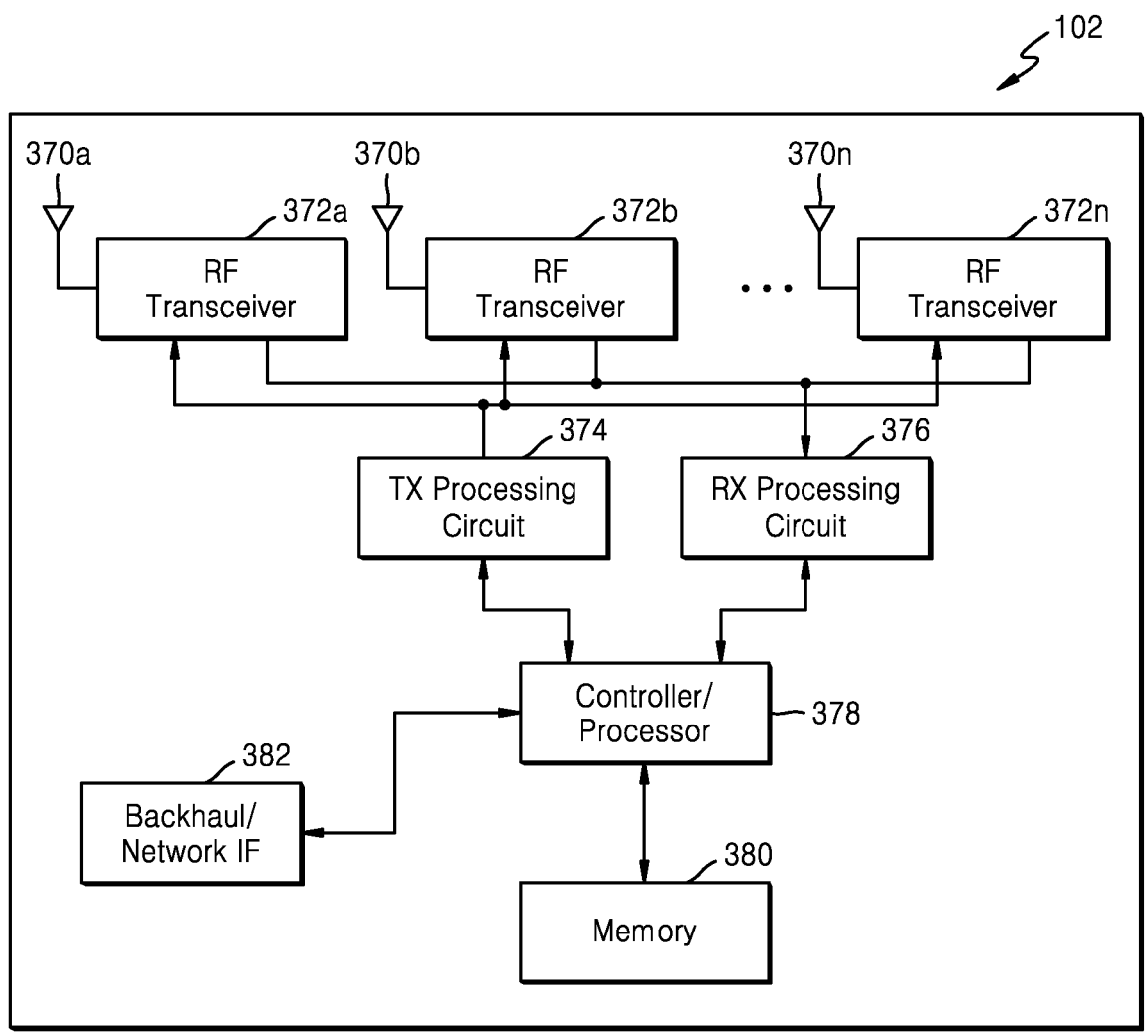
FIG. 3B is a diagram illustrating a gNB, according to an embodiment.

FIG. 3B is a diagram illustrating a gNB, according to an embodiment. The second gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that the first gNB 101 and the third gNB 103 can include the same or similar structures as the second gNB 102.

As shown in FIG. 3B, the second gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The second gNB 102 also includes a controller/processor 378, a memory 380, and a backhaul or network interface 382.

The RF transceivers 372a-372n receive an incoming RF signal from the antennas 370a-370n, such as a signal transmitted by UEs or other gNBs. The RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from the TX processing circuit 374 and up-convert the baseband or IF signal into an RF signal transmitted via the antennas 370a-370n.

The controller/processor 378 can include one or more processors or other processing devices that control the overall operation of the second gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. The controller/processor 378 may support any of a variety of other functions in the second gNB 102. The controller/processor 378 may include at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. The controller/processor 378 may support communication between entities such as web RTCs. The controller/processor 378 can move data into or out of the memory 380 as required by an execution process.

The controller/processor 378 is also coupled to the backhaul or network interface 382. The backhaul or network interface 382 allows the second gNB 102 to communicate with other devices or systems through a backhaul connection or through a network. The backhaul or network interface 382 can support communication over any suitable wired or wireless connection(s). For example, when the second gNB 102 is implemented as a part of a cellular communication system, such as a cellular communication system supporting 5G or new radio access technology or NR, LTE or LTE-A, the backhaul or network interface 382 can allow the second gNB 102 to communicate with other gNBs through wired or wireless backhaul connections. When the second gNB 102 is implemented as an access point, the backhaul or network interface 382 can allow the second gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of the second gNB 102 (implemented using RF transceivers 372a-372n, TX processing circuit 374 and/or RX processing circuit 376) support aggregated communication with FDD cells and TDD cells.

Although FIG. 3B illustrates an example of the second gNB 102, various changes may be made to FIG. 3B. For example, the second gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the second gNB 102 can include multiple instances of each (such as one for each RF transceiver).

Those skilled in the art will understand that "terminal" and "terminal device", as used herein, include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a PDA, which may include a radio frequency receiver, a pager, an internet/intranet access, a web browser, a notepad, a calendar and/or a global positioning system (GPS) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a mobile Internet device (MID) and/or a mobile phone with music/video playing functions, a smart TV, a set-top box and other devices.

Embodiments of the disclosure are further described below with reference to the drawings.

With the rapid development of information industry, especially the increasing demand from mobile Internet and Internet of things (IoT), it brings unprecedented challenges to the future mobile communication technology. In order to meet the unprecedented challenges, the communication industry and academia have carried out extensive research on the 5G mobile communication technology. In 3rd Generation Partnership Project (3GPP), the first stage of 5G is already in progress. To support more flexible scheduling, the 3GPP decides to support variable HARQ-ACK feedback delay in 5G. In existing LTE systems, a time from reception of downlink data to uplink transmission of HARQ-ACK is fixed. For example, in FDD systems, the delay is 4 subframes. In TDD systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios—eMBB, mMTC and URLLC. The eMBB scenario aims to further improve data transmission rate on the basis of the existing mobile broadband service scenario, so as to enhance user experience and pursue ultimate communication experience between people. mMTC and URLLC are, for example, the application scenarios of the IoT, but their respective emphases are different: mMTC being mainly information interaction between people and things, while URLLC mainly reflecting communication requirements between things.

In 5G, HARQ-ACK information may be cancelled for various reasons. In order to avoid retransmission of downlink data, HARQ-ACK information that has been cancelled may be retransmitted. In this case, it is necessary to consider how to indicate retransmission of the HARQ-ACK information. In addition, it is necessary to consider how to generate the HARQ-ACK codebook of the retransmitted HARQ-ACK information.

In order to solve at least the above technical problems, embodiments provide a method performed by a terminal, the terminal, a method performed by a base station, and the base station in a wireless communication system, and a non-transitory computer-readable storage medium.

For the convenience of description, a first transceiving node and a second transceiving node are defined. For example, the first transceiving node may be a base station, and the second transceiving node may be a UE. Herein, the base station is taken as an example (but not limited thereto) to illustrate the first transceiving node, and the UE is taken as an example (but not limited thereto) to illustrate the second transceiving node.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
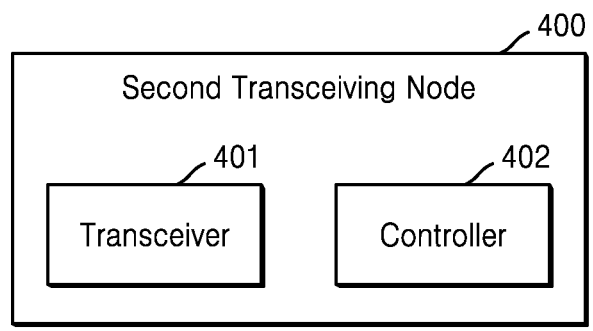
FIG. 4 is a diagram illustrating a second transceiving node, according to an embodiment.

FIG. 4 is a diagram illustrating the second transceiving node, according to an embodiment.

Referring to FIG. 4, a second transceiving node 400 includes a transceiver 401 and a controller 402.

The transceiver 401 may be configured to receive first data and/or first control signaling from the first transceiving node, and transmit second data and/or second control signaling to the first transceiving node in a determined time unit.

The controller 402 may be an application specific integrated circuit or at least one processor. The controller 402 may be configured to control the overall operation of the second transceiving node 400 and control the second transceiving node 400 to implement the methods proposed in embodiments of the disclosure. For example, the controller 402 may be configured to determine the second data and/or the second control signaling and a time unit for transmitting the second data and/or the second control signaling based on the first data and/or the first control signaling, and control the transceiver 401 to transmit the second data and/or the second control signaling to the first transceiving node in the determined time unit.

The controller 402 may be configured to perform one or more operations in methods of various embodiments described below. For example, the controller 402 may be configured to perform one or more of operations in a method 500 to be described later in connection with FIG. 5 and/or a method 1000 described in connection with FIG. 10.

The first data may be data transmitted by the first transceiving node to the second transceiving node 400. In the following examples, downlink data carried by a physical downlink shared channel (PDSCH) is taken as an example (but not limited thereto) to illustrate the first data.

The second data may be data transmitted by the second transceiving node 400 to the first transceiving node. In the following examples, uplink data carried by a physical uplink shared channel (PUSCH) is taken as an example to illustrate the second data, but not limited thereto.

The first control signaling may be control signaling transmitted by the first transceiving node to the second transceiving node. In the following examples, downlink control signaling is taken as an example (but not limited thereto) to illustrate the first control signaling. The downlink control signaling may be DCI carried by a physical downlink control channel (PDCCH) and/or control signaling carried by a PDSCH. For example, the DCI may be UE specific DCI, and the DCI may also be common DCI. The common DCI may be DCI common to a part of UEs, such as group common DCI, and the common DCI may also be DCI common to all of the UEs. The DCI may be uplink DCI (e.g., DCI for scheduling a PUSCH) and/or downlink DCI (e.g., DCI for scheduling a PDSCH).

The second control signaling may be control signaling transmitted by the second transceiving node 400 to the first transceiving node. In the following examples, uplink control signaling is taken as an example (but is not limited thereto) to illustrate the second control signaling. The uplink control signaling may be uplink control information (UCI) carried by a physical uplink control channel (PUCCH) and/or control signaling carried by a PUSCH. A type of UCI may include one or more of: HARQ-ACK information, scheduling request (SR), link recovery request (LRR), channel state information (CSI) or configured grant (CG) UCI. When UCI is carried by a PUCCH, the UCI may be used interchangeably with the PUCCH.

A PUCCH carrying SR may be a PUCCH carrying positive SR and/or negative SR. SR may be positive SR and/or negative SR.

The CSI may also be Part 1 CSI and/or Part 2 CSI.

A first time unit may be a time unit in which the first transceiving node transmits the first data and/or the first control signaling. In the following examples, a downlink time unit is taken as an example (but not limited thereto) to illustrate the first time unit.

A second time unit may be a time unit in which the second transceiving node transmits the second data and/or the second control signaling. In the following examples, an uplink time unit is taken as an example (but not limited thereto) to illustrate the second time unit.

The first time unit and the second time unit may be one or more slots, one or more subslots, one or more OFDM symbols, or one or more subframes.

Herein, depending on the network type, the term "base station" or "BS" can refer to any component (or a set of components) configured to provide wireless access to a network, such as a transmission point (TP), a transmission and reception point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols (e.g., 5G 3GPP NR interface/access, LTE, LTE-A, High Speed Packet Access (HSPA), Wi-Fi 802.11a/b/g/n/ac, etc.

In describing a wireless communication system below, higher layer signaling or higher layer signals may be signal transferring methods for transferring information from a base station to a terminal over a downlink data channel of a physical layer or from a terminal to a base station over an uplink data channel of a physical layer, and examples of the signal transferring methods may include signal transferring methods for transferring information via radio resource control (RRC) signaling, packet data convergence protocol (PDCP) signaling, or a medium access control (MAC) control element (MAC CE).

Figure 5:
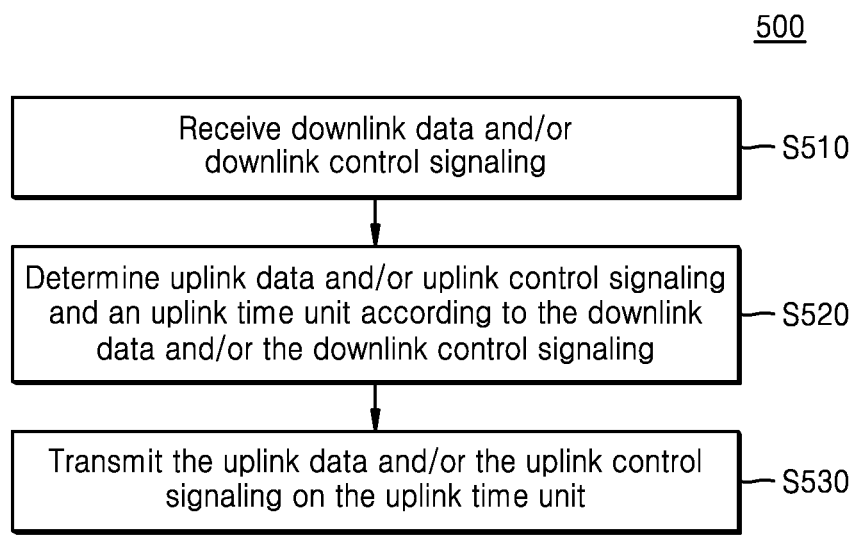
FIG. 5 is a flowchart illustrating a method performed by a UE, according to an embodiment.

FIG. 5 is flowchart illustrating a method performed by a UE, according to an embodiment.

Referring to FIG. 5, at S510, the UE receives downlink data (e.g., downlink data carried by a PDSCH) and/or downlink control signaling from a base station. For example, the UE may receive the downlink data and/or the downlink control signaling from the base station based on predefined rules and/or received configuration parameters.

At S520, the UE determines uplink data and/or uplink control signaling and an uplink time unit based on the downlink data and/or downlink control signaling.

At S530, the UE transmits the uplink data and/or the uplink control signaling to the base station in an uplink time unit.

Acknowledgement/negative acknowledgement (ACK/NACK) for downlink transmissions may be performed through HARQ-ACK.

The downlink control signaling may include DCI carried by a PDCCH and/or control signaling carried by a PDSCH. For example, the DCI may be used to schedule transmission of a PUSCH or reception of a PDSCH. Some examples of uplink transmission timing are described below with reference to FIGS. 6A-6C.

Figure 6A:
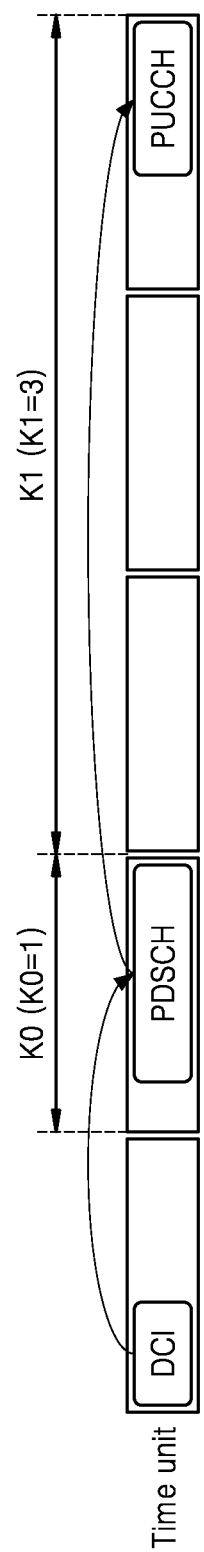
FIGS. 6A-6C are diagrams illustrating uplink transmission timing, according to an embodiment.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval from the PDSCH scheduled by the DCI to the PDCCH carrying the DCI is one slot. Herein, "a UE receives DCI" may mean that "the UE detects the DCI".

Figure 6B:
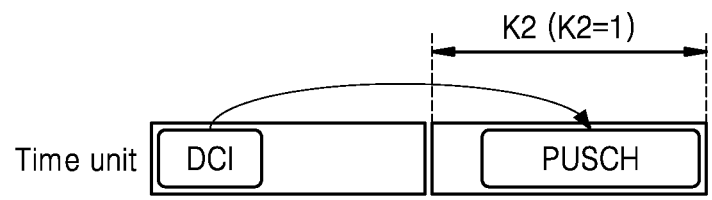

In another example, the UE receives the DCI and transmits the PUSCH based on time domain resources indicated by the DCI. For example, a parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot. K2 may also represent a time interval between a PDCCH for activating a configured grant (CG) PUSCH and the first activated CG PUSCH. Herein, unless otherwise specified, the PUSCH may be a dynamically scheduled PUSCH (e.g., scheduled by DCI) (for example, may be referred to as dynamic grant (DG) PUSCH, in embodiments of the disclosure) and/or a PUSCH not scheduled by DCI (e.g., CG PUSCH).

In yet another example, the UE receives the PDSCH, and may transmit HARQ-ACK information for the PDSCH reception in a PUCCH in the uplink time unit. For example, a timing parameter (which may also be referred to as a timing value) K1 (e.g., the parameter dl-DataToUL-ACK in 3 GPP) may be used to represent a time interval between the PUCCH for transmitting the HARQ-ACK information for the PDSCH reception and the PDSCH, and K1 may be in units of uplink time units, such as slots or subslots. In a case where K1 is in units of slots, the time interval is a value of a slot offset between the PUCCH for feeding back the HARQ-ACK information for the PDSCH reception and the PDSCH, and K1 may be referred to as a slot timing value. For example, FIG. 6A gives an example in which K1=3. In the example illustrated in FIG. 6A, the time interval between the PUCCH for transmitting the HARQ-ACK information for the PDSCH reception and the PDSCH is 3 slots. The timing parameter K1 may be used interchangeably with a timing parameter $K_1$, the timing parameter K0 may be used interchangeably with a timing parameter $K_0$, and the timing parameter K2 may be used interchangeably with a timing parameter $K_2$.

The PDSCH may be a PDSCH scheduled by the DCI and/or an SPS PDSCH. The UE will periodically receive the SPS PDSCH after the SPS PDSCH is activated by the DCI. The SPS PDSCH may be equivalent to a PDSCH not scheduled by the DCI/PDCCH. After the SPS PDSCH is released (deactivated), the UE will no longer receive the SPS PDSCH.

HARQ-ACK may be HARQ-ACK for a SPS PDSCH reception (e.g., HARQ-ACK not indicated by DCI) and/or HARQ-ACK indicated by a DCI format (e.g., HARQ-ACK for a PDSCH reception scheduled by a DCI format).

Figure 6C:
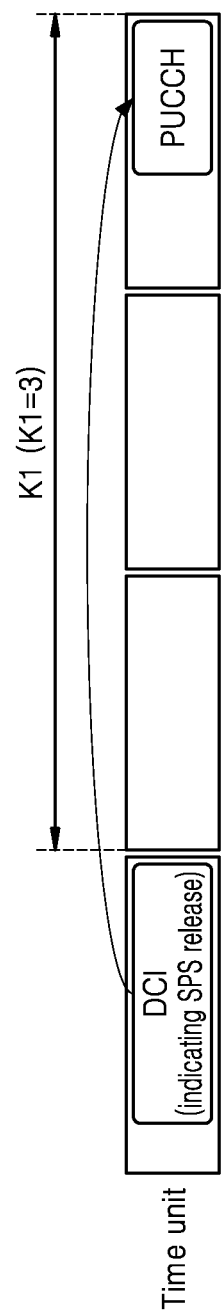

In yet another example, the UE receives the DCI (e.g., DCI indicating semi-persistent scheduling (SPS) PDSCH release (deactivation)), and may transmit HARQ-ACK information for the DCI in the PUCCH in the uplink time unit. For example, the timing parameter K1 may be used to represent a time interval between the PUCCH for transmitting the HARQ-ACK information for the DCI and the DCI, and K1 may be in units of uplink time units, such as slots or subslots. For example, FIG. 6C gives an example in which K1=3. In the example of FIG. 6C, the time interval between the PUCCH for transmitting the HARQ-ACK information for the DCI and the DCI is 3 slots. For example, the parameter K1 may be used to represent a time interval between a PDCCH reception with DCI indicating SPS PDSCH release (deactivation) and the PUCCH feeding back HARQ-ACK for the PDCCH reception.

At S520 of FIG. 5, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

The base station may configure higher layer signaling for the UE based on a UE capability previously received from the UE (e.g., at S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

Downlink channels (downlink resources) may include PDCCHs and/or PDSCHs. Uplink channels (uplink resources) may include PUCCHs and/or PUSCHs.

The UE may be configured with two levels of priorities for uplink transmission. For example, the UE may be configured to multiplex UCIs with different priorities via higher layer signaling (e.g., via the 3GPP parameter UCI-MUXWithDifferentiatPriority); otherwise (e.g., if the UE is not configured to multiplex UCIs with different priorities), the UE performs prioritization for PUCCHs and/or PUSCHs with different priorities. For example, the two levels of priorities may include a first priority and a second priority which are different from each other. In an example, the first priority may be higher than the second priority. In another example, the first priority may be lower than the second priority. However, embodiments of the disclosure are not limited to this, and for example, the UE may be configured with more than two levels of priorities. For the sake of convenience, description is made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

The multiplexing of multiple uplink transmissions (e.g., PUCCH and/or PUSCH) overlapping in time domain may be multiplexing of UCI information included in the PUCCH in a PUCCH or PUSCH.

The prioritization of two uplink transmissions (e.g., PUCCH and/or PUSCH) that overlap in time domain by the UE may include that the UE transmits an uplink transmission (e.g., PUCCH or PUSCH) with the higher priority and does not transmit an uplink transmission (PUCCH or PUSCH) with the lower priority.

The UE may be configured with a subslot-based PUCCH transmission. For example, a subslot length parameter (which may also be referred to as a parameter related to a subslot length in embodiments of the disclosure) (e.g., the parameter subslotLengthForPUCCH in 3GPP) of each PUCCH configuration parameter of the first PUCCH configuration parameter and the second PUCCH configuration parameter may be 7 OFDM symbols or 6 OFDM symbols or 2 OFDM symbols. Subslot configuration length parameters in different PUCCH configuration parameters may be configured separately. If no subslot length parameter is configured in a PUCCH configuration parameter, the scheduling time unit of this PUCCH configuration parameter is one slot by default. If a subslot length parameter is configured in the PUCCH configuration parameter, the scheduling time unit of this PUCCH configuration parameter is L (L is the configured subslot configuration length) OFDM symbols.

The mechanism of slot-based PUCCH transmissions is basically the same as that of subslot-based PUCCH transmissions. Herein, a slot may be used to represent a PUCCH occasion unit; for example, if the UE is configured with subslots, a slot which is a PUCCH occasion unit may be replaced with a subslot. For example, it may be specified by protocols that if the UE is configured with the subslot length parameter (e.g., the parameter subslotLengthForPUCCH in 3GPP), unless otherwise indicated, a number of symbols contained in the slot of the PUCCH transmission is indicated by the subslot length parameter.

For example, if the UE is configured with the subslot length parameter, and subslot n is the last uplink subslot overlapping with a PDSCH reception or PDCCH reception (e.g., for SPS PDSCH release, and/or indicating secondary cell dormancy, and/or triggering a Type-3 HARQ-ACK codebook report and without scheduling a PDSCH reception), then HARQ-ACK information for the PDSCH reception or PDCCH reception is transmitted in an uplink subslot n+k, where k is determined by the timing parameter K1 (the definition of the timing parameter K1 may refer to the previous description). For another example, if the UE is not configured with the subslot length parameter, and slot n is the last uplink slot overlapping with a downlink slot where the PDSCH reception or PDCCH reception is located, then the HARQ-ACK information for the PDSCH reception or PDCCH reception is transmitted in an uplink slot n+k, where K is determined by the timing parameter K 1.

Unicast may refer to a manner in which a network communicates with a UE, and multicast/broadcast may refer to a manner in which a network communicates with multiple UEs. For example, a unicast PDSCH may be a PDSCH received by a UE, and the scrambling of the PDSCH may be based on a radio network temporary identifier (RNTI) specific to the UE (e.g., Cell-RNTI (C-RNTI)). A multicast/broadcast PDSCH may be a PDSCH received by more than one UE simultaneously, and the scrambling of the multicast/broadcast PDSCH may be based on a UE-group common RNTI. For example, the UE-group common RNTI for scrambling the multicast/broadcast PDSCH may include an RNTI (referred to as G-RNTI) for scrambling of a dynamically scheduled multicast/broadcast transmission (e.g., PDSCH) or an RNTI (referred to as G-CS-RNTI) for scrambling of a multicast/broadcast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH. UCI(s) of the multicast (or groupcast)/broadcast PDSCH may include HARQ-ACK information for the multicast/broadcast PDSCH. "Multicast/Broadcast" may refer to at least one of multicast or broadcast.

A HARQ-ACK codebook may include HARQ-ACK information for one or more PDSCHs and/or DCI. If the HARQ-ACK information for the one or more PDSCHs and/or DCI is transmitted in a same uplink time unit, the UE may generate the HARQ-ACK codebook based on a predefined rule. For example, if a PDSCH is successfully decoded, the HARQ-ACK information for this PDSCH is positive ACK. The positive ACK may be represented by 1 in the HARQ-ACK codebook, for example. If a PDSCH is not successfully decoded, the HARQ-ACK information for this PDSCH is negative ACK (NACK). NACK may be represented by 0 in the HARQ-ACK codebook, for example. For example, the UE may generate the HARQ-ACK codebook based on the pseudo code specified by protocols. In an example, if the UE receives a DCI format that indicates SPS PDSCH release (deactivation), the UE transmits HARQ-ACK information (ACK) for the DCI format. In another example, if the UE receives a DCI format that indicates secondary cell dormancy, the UE transmits the HARQ-ACK information (ACK) for the DCI format. In yet another example, if the UE receives a DCI format that indicates to transmit HARQ-ACK information (e.g., a Type-3 HARQ-ACK codebook in 3GPP) of all HARQ-ACK processes of all configured serving cells, the UE transmits the HARQ-ACK information of all HARQ-ACK processes of all configured serving cells. In order to reduce a size of the Type-3 HARQ-ACK codebook, in an enhanced Type-3 HARQ-ACK codebook, the UE may transmit HARQ-ACK information of a specific HARQ-ACK process of a specific serving cell based on an indication of the DCI. In yet another example, if the UE receives a DCI format that schedules a PDSCH, the UE transmits HARQ-ACK information for the PDSCH. In yet another example, the UE receives a SPS PDSCH, and the UE transmits HARQ-ACK information for the SPS PDSCH reception. In yet another example, if the UE is configured by higher layer signaling to receive a SPS PDSCH, the UE transmits HARQ-ACK information for the SPS PDSCH reception. The reception of the SPS PDSCH configured by higher layer signaling may be cancelled by other signaling. In yet another example, if at least one uplink symbol (e.g., OFDM symbol) of the UE in a semi-static frame structure configured by higher layer signaling overlaps with a symbol of a SPS PDSCH, the UE does not receive the SPS PDSCH. In yet another example, if the UE is configured by higher layer signaling to receive a SPS PDSCH according to a predefined rule, the UE transmits HARQ-ACK information for the SPS PDSCH reception. It should be noted that "'A' overlaps with 'B'" may mean that 'A' at least partially overlaps with 'B'. That is, "'A' overlaps with 'B'" includes a case where 'A' completely overlaps with 'B'.

If HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCH receptions, the UE may generate HARQ-ACK information according to a rule for generating a SPS PDSCH HARQ-ACK codebook.

If HARQ-ACK information transmitted in a same uplink time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ-ACK codebook (e.g., Type-1 HARQ-ACK codebook in 3GPP) or a dynamic HARQ-ACK codebook (e.g., Type-2 HARQ-ACK codebook in 3GPP) according to a PDSCH HARQ-ACK codebook configuration parameter (e.g., the parameter pdsch-HARQ-ACK-Codebook in 3GPP). The dynamic HARQ-ACK codebook may also be an enhanced dynamic HARQ-ACK codebook (e.g., Type-2 HARQ-ACK codebook based on grouping and HARQ-ACK retransmission in 3GPP).

If HARQ-ACK information transmitted in a same uplink time unit includes only HARQ-ACK information for a SPS PDSCH (e.g., a PDSCH not scheduled by a DCI format), the UE may generate the HARQ-ACK codebook according to a rule for generating a HARQ-ACK codebook for a SPS PDSCH reception (e.g., the pseudo code for generating a HARQ-ACK codebook for a SPS PDSCH reception defined in 3GPP).

The dynamic HARQ-ACK codebook and/or the enhanced dynamic HARQ-ACK codebook may determine a size and an order of the HARQ-ACK codebook according to an assignment indicator. For example, the assignment indicator may be a downlink assignment indicator (DAI). The assignment indicator as the DAI is taken as an example for illustration. However, the embodiments of the disclosure are not limited thereto, and any other suitable assignment indicator may be adopted.

A DAI field includes at least one of a first DAI and a second DAI.

The first DAI may be a counter-DAI (C-DAI). The first DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to: an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or an accumulative number of PDCCH(s) up to the current time unit; or an accumulative number of PDSCH transmission(s) up to the current time unit; or an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit; or an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit. The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

The second DAI may be a total-DAI (T-DAI). The second DAI may indicate a total number of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to: a total number of {serving cell, time unit} pairs scheduled by PDCCH(s) up to the current time unit within a time window (which may also include a number of PDCCHs for indicating SPS release); or a total number of PDSCH transmissions up to the current time unit; or a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit; or a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or a total number of PDSCHs (the PDSCHs are PDSCHs with corresponding PDCCHs) already scheduled by the base station up to the current serving cell and/or the current time unit; or a total number of time units with PDSCH transmissions (for example, the PDSCHs are PDSCHs with corresponding PDCCHs) already scheduled by the base station up to the current serving cell and/or the current time unit. The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, but the examples are not limited thereto.

Tables 1 and 2 show a correspondence between the DAI field and $V_{T\text{-}DAI,m}$ or $V_{C\text{-}DAI,c,m}$ or $V_{T\text{-}DAI}^{UL}$. Numbers of bits of the C-DAI and T-DAI are limited.

For example, in a case where the C-DAI or T-DAI is represented with 2 bits, the value of the C-DAI or T-DAI in the DCI may be determined by equations in Table 1. $V_{T\text{-}DAI,m}$ or $V_{T\text{-}DAI}^{UL}$ is the value of the T-DAI in DCI received in a PDCCH monitoring occasion (MO) m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,c,m}$ are related to a number of bits of the DAI field in the DCI. MSB is the Most Significant Bit and LSB is the Least Significant Bit.

TABLE 1

| MSB, LSB of DAI Field | $V_{T\text{-}DAI,m}$ or $V_{C\text{-}DAI,c,m}$ or $V_{T\text{-}DAI}^{UL}$ | Y |
|---|---|---|
| 0, 0 | 1 | (Y − 1) mod 4 + 1 = 1 |
| 0, 1 | 2 | (Y − 1) mod 4 + 1 = 2 |

TABLE 1-continued

| MSB, LSB of DAI Field | $V_{T\text{-}DAI, m}$ or $V_{C\text{-}DAI, c, m}$ or $V_{T\text{-}DAI}^{UL}$ | Y |
|---|---|---|
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 1, all of the DAI field are indicated with "00", and the value of $V_{T\text{-}DAI,m}$ or $V_{C\text{-}DAI,c,m}$ is represented as "1" by the equation in Table 1. Y may represent the value of the DAI corresponding to the number of DCIS actually transmitted by the base station (the value of the DAI before conversion by the equation in the table).

For example, in a case where the C-DAI or T-DAI in the DCI is 1 bit, values greater than 2 may be represented by equations in Table 2.

TABLE 2

| DAI field | $V_{T\text{-}DAI, m}$ or $V_{C\text{-}DAI, c, m}$ | Y |
|---|---|---|
| 0 | 1 | (Y − 1) mod 2 + 1 = 1 |
| 1 | 2 | (Y − 1) mod 2 + 1 = 2 |

Unless the context clearly indicates otherwise, all or one or more of the methods, steps or operations described herein may be specified by protocols and/or configured by higher layer signaling and/or indicated by dynamic signaling. The dynamic signaling may be a PDCCH and/or DCI and/or a DCI format. For example, a SPS PDSCH and/or a CG PUSCH may be dynamically indicated in a corresponding activated DCI/DCI format/PDCCH. All or one or more of the described methods, steps and operations may be optional. For example, if a certain parameter (e.g., parameter X) is configured, the UE performs a certain approach (e.g., approach A), otherwise (if the parameter, e.g., parameter X, is not configured), the UE performs another approach (e.g., approach B).

A primary cell (PCell) or primary secondary cell (PSCell) may be used interchangeably with a cell having a PUCCH.

Methods for downlink may also be applicable to uplink, and methods for uplink may also be applicable to downlink. For example, a PDSCH may be replaced with a PUSCH, an SPS PDSCH may be replaced with CG PUSCH, and downlink symbols may be replaced with uplink symbols, so that methods for downlink may be applicable to uplink.

Methods applicable to multiple PDSCH/PUSCH scheduling may also be applicable to a PDSCH/PUSCH transmission with repetitions. For example, a PDSCH/PUSCH of multiple PDSCH/PUSCHs may be replaced by a repetition of multiple repetitions of the PDSCH/PUSCH transmission.

In methods described herein, "configured with and/or indicated a transmission with repetitions" may be understood that the number of the repetitions of the transmission is greater than 1. For example, "configured with and/or indicated a transmission with repetitions" may be replaced with "PUCCH repeatedly transmitted on more than one slot/sub-slot". "Not configured and/or indicated with a transmission with repetitions" may be understood that the number of the repetitions of the transmission equals to 1. For example, "PUCCH that is not configured with and/or indicated repetitions" may be replaced by "PUCCH transmission with the number of the repetitions of 1". For example, the UE may be configured with a parameter $N_{PUCCH}^{repeat}$ related to the number of repetitions of PUCCH; when the parameter $N_{PUCCH}^{repeat}$ is greater than 1, it may mean that the UE is configured with a PUCCH transmission with repetitions, and the UE may repeat the PUCCH transmission on $N_{PUCCH}^{repeat}$ units (e.g., slots); when the parameter is equal to 1, it may mean that the UE is not configured with a PUCCH transmission with repetitions. For example, the repeatedly transmitted PUCCH may contain only one type of UCI. If the PUCCH is configured with repetitions, in embodiments of the disclosure, a repetition of the multiple repetitions of the PUCCH may be used as a PUCCH (or a PUCCH resource), or all of the repetitions of the PUCCH may be used as a PUCCH (or a PUCCH resource), or a specific repetition of the multiple repetitions of the PUCCH may be used as a PUCCH (or a PUCCH resource).

In methods herein, a PDCCH and/or DCI and/or a DCI format schedules multiple PDSCHs/PUSCHs, which may be multiple PDSCHs/PUSCHs of a same serving cell and/or multiple PDSCHs/PUSCHs of different serving cells.

The multiple manners described herein may be combined in any order. In a combination, a manner may be performed one or more times.

Steps of methods herein may be implemented in any order.

In methods described herein, "canceling a transmission" may mean canceling the transmission of the entire uplink channel and/or cancel the transmission of a part of the uplink channel.

In methods described herein, an "ascending order" may be replaced by a "descending order", and/or a "descending order" may be replaced by an "ascending order".

In methods of the disclosure, a PUCCH/PUSCH carrying A may be understood as a PUCCH/PUSCH only carrying A, and may also be understood as a PUCCH/PUSCH carrying at least A.

A "slot" may be replaced by a "subslot" or a "time unit" herein.

that the term "at least one" may be understood as "one" or "multiple". In the case of "multiple", it may be any permutation and combination of the listed items. For example, at least one of "A", "B" and "C" may be: "A", "B", "C", "AB", "BA", "ABC", "CBA", "ABCA", "ABCCB", etc.

A transmission of a PUCCH and/or PUSCH with/carrying/including HARQ-ACK information may be cancelled, or the base station may not receive and/or successfully decode the HARQ-ACK information. For example, if a PUCCH carrying HARQ-ACK information for a SPS PDSCH and/or a scheduling-free PUSCH (e.g., configured grant PUSCH (CG-PUSCH)) with HARQ-ACK information overlap with a set of downlink symbols and/or flexible symbols indicated by higher layer signaling (e.g., the parameter tdd-UL-DL-ConfigurationCommon or the parameter tdd-UL-DL-ConfigurationDedicated) and/or DCI (e.g., a dynamic slot format indicator (SFI) included therein), the UE does not transmit and/or cancel the transmission of the HARQ-ACK for the SPS PDSCH. In another example, a PUCCH and/or PUSCH with HARQ-ACK with the lower priority are cancelled by an uplink transmission with the higher priority. However, the reason why the HARQ-ACK information is not transmitted and/or cancelled is not limited thereto. In addition, in embodiments of the disclosure, the expression "not transmit . . . " may be used interchangeably with the expression "cancel the transmission of . . . ". Furthermore, the term "transmit" may be used interchangeably with the term "send".

Figure 7:
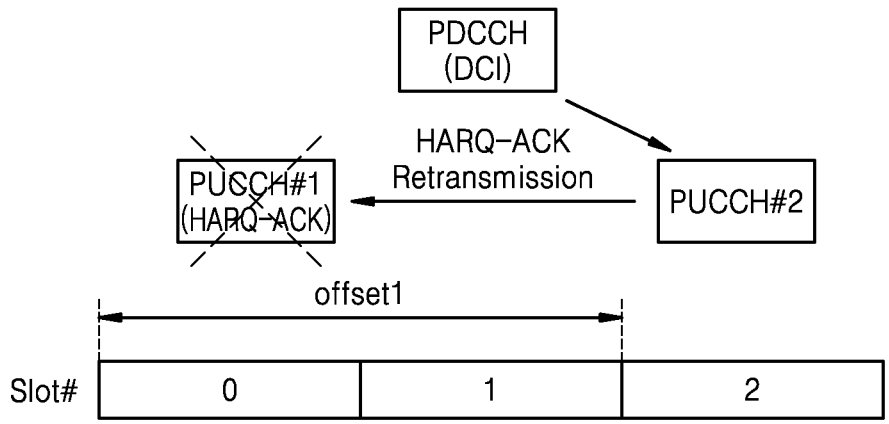
FIG. 7 is a diagram illustrating a first offset indicator (offset1), according to an embodiment.

HARQ-ACK information (a HARQ-ACK codebook) carried by a PUCCH (or in a slot) may be indicated to be retransmitted in another PUCCH (or slot) and/or PUSCH by a DCI format (downlink DCI format and/or uplink DCI format). As an example, a time unit interval (e.g., slot interval) or time unit offset (e.g., slot offset) (which is represented by a first offset indicator (or simply referred to as a first offset) or offset1) between the PUCCH (or slot) carrying the HARQ-ACK information (HARQ-ACK codebook) to be retransmitted and the PUCCH (or slot) for retransmitting the HARQ-ACK information (HARQ-ACK codebook) may be indicated in a downlink DCI format. As shown in FIG. 7, the PUCCH carrying the HARQ-ACK information (HARQ-ACK codebook) to be retransmitted is PUCCH #1 (or PUCCH #1 is a PUCCH in which the HARQ-ACK information is not transmitted or cancelled; therein, for example, the HARQ-ACK information in PUCCH #1 may be initially transmitted HARQ-ACK information (HARQ-ACK information in an initial transmission) or retransmitted HARQ-ACK information (HARQ-ACK information in a retransmission)), and the slot carrying the HARQ-ACK information (HARQ-ACK codebook) to be transmitted has a slot number of 0 (slot #0). The PUCCH carrying the retransmission of the HARQ-ACK information (HARQ-ACK codebook) is PUCCH #2, and the slot carrying the retransmission of the HARQ-ACK information (HARQ-ACK codebook) has a slot number of 2 (slot #2). In this case, offset1 indicates a time unit interval (2, in this example) from PUCCH #2 to PUCCH #1, or a time unit interval (−2, in this example) from PUCCH #1 to PUCCH #2.

Figure 8:
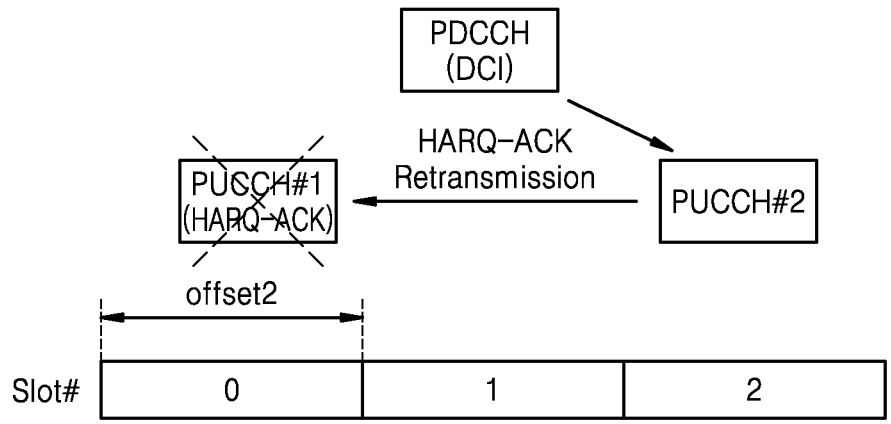
FIG. 8 is a diagram illustrating a second offset indicator (offset2), according to an embodiment.

As another example, a time unit interval (e.g., slot interval) or time unit offset (e.g., slot offset) (which is represented by a second offset indicator (or simply referred to as a second offset offset) or offset2) between the PUCCH (or slot) carrying the HARQ-ACK information (HARQ-ACK codebook) to be retransmitted and a PDCCH (or slot) carrying DCI indicating (or triggering) the retransmission of the HARQ-ACK information may be indicated in a downlink DCI format. As shown in FIG. 8, the PUCCH carrying the HARQ-ACK information (HARQ-ACK codebook) to be retransmitted is PUCCH #1 (or PUCCH #1 is a PUCCH in which the HARQ-ACK information is not transmitted or cancelled; therein, for example, the HARQ-ACK information in PUCCH #1 may be initially transmitted HARQ-ACK information or retransmitted HARQ-ACK information), and the slot carrying the HARQ-ACK information (HARQ-ACK codebook) to be retransmitted is slot 0. The slot where the PDCCH carrying the DCI indicating the retransmission of the HARQ-ACK information is located is slot 1. Offset2 indicates a time unit interval (1, in this example) from the PDCCH to PUCCH #1, or a time unit interval (−1, in this example) from PUCCH #1 to the PDCCH.

An SCS of a PDCCH may be different from that of a PUCCH, or a PUCCH is configured with sub-slots and a PDCCH or a slot of the PDCCH may overlap with slots of more than one PUCCH. In these cases, it is necessary to clarify references for Offset1 and/or Offset2. For example, the end position (or end symbol) of the PDCCH or the end position (or end symbol) of a slot of the PDCCH where the PDCCH is located may be used as a reference.

For example, with reference to slots of PUCCH transmissions on a primary cell and for Type-1 or Type-2 HARQ-ACK codebooks, the UE that transmits or would transmit a first HARQ-ACK codebook (for example, a PUCCH or PUSCH with the first HARQ-ACK codebook; that is, the first HARQ-ACK codebook may be carried by the PUCCH or PUSCH) in slot m may be indicated by a DCI format carried by a PDCCH ending in slot n (i.e., with the end position (for example, the end symbol) being in slot n) (for example, the DCI format does not schedule a PDSCH reception and/or does not indicate feedback of specific HARQ-ACK information (for example, the specific HARQ-ACK information may be initially transmitted HARQ-ACK information, which may be non-retransmitted HARQ-ACK information; the specific HARQ-ACK information may be initially transmitted HARQ-ACK information, which may be HARQ-ACK information in a HARQ-ACK codebook that is not the first HARQ-ACK codebook), to transmit a PUCCH with the first HARQ-ACK codebook in slot n+k, where slot n+k may be after slot m.

If a PUCCH carrying a Mode-1 HARQ-ACK retransmission overlaps with a PUSCH scheduled by a DCI format in time domain, the HARQ-ACK information may be multiplexed in the PUSCH for transmission. It may be specified by protocols that a PDCCH that triggers the Mode-1 HARQ-ACK retransmission is not later than or is earlier than the PDCCH that schedules the PUSCH. The definition of "Mode-1 HARQ-ACK retransmission" may refer to the embodiments described later.

At least one of the following approaches MN1~MN2 may be adopted to generate a HARQ-ACK codebook. For example, with reference to slots of PUCCH transmissions on a primary cell, the UE that transmits or would transmit a first HARQ-ACK codebook (for example, a PUCCH or PUSCH with the first HARQ-ACK codebook; that is, the first HARQ-ACK codebook may be carried by the PUCCH or PUSCH) in slot m may be indicated by a DCI format carried by a PDCCH ending in slot n (i.e., with the end position (for example, the end symbol) being in slot n) to transmit a second PUCCH with the first HARQ-ACK codebook in slot n+k; if the UE multiplexes the HARQ-ACK of the second PUCCH in a second PUSCH, it may generate the HARQ-ACK codebook by adopting at least one of the following Approaches MN1 to MN2.

In Approach MN1, the first HARQ-ACK codebook in the second PUSCH may be the first HARQ-ACK codebook transmitted or to be transmitted in slot m. That is, DAI information of the first HARQ-ACK codebook is not indicated in a DCI format scheduling the second PUSCH. In Approach MN1, the first HARQ-ACK codebook transmitted or to be transmitted in slot m is determined as the first HARQ-ACK codebook in the second PUSCH.

The method is simple to implement and can reduce the implementation complexity of the UE and base station.

In Approach MN2, the first HARQ-ACK codebook in the second PUSCH may be determined according to a first UL DAI field in the DCI format scheduling the second PUSCH. It may be specified by protocols and/or configured by higher layer signaling that, the first UL DAI field may be a specific UL DAI indicating the first HARQ-ACK codebook. Or, the first UL DAI field may be an UL DAI field indicating the first HARQ-ACK codebook and a second HARQ-ACK codebook, which is a non-retransmitted HARQ-ACK codebook carried in the second PUCCH. That is, the UE may reuse the existing UL DAI field to indicate a total DAI of the first HARQ-ACK codebook.

The method can improve the reliability of the transmission of the HARQ-ACK codebook, and avoid inconsistent understanding of the HARQ-ACK codebook between the base station and the UE due to a missed detection of the PDCCH.

The method can be applied to the same physical layer priority. The method can be suitable for dynamic HARQ-ACK codebooks and/or semi-static HARQ-ACK codebooks.

For convenience of description, the above-described HARQ-ACK retransmission may be referred to as Mode-1 HARQ-ACK retransmission. However, this is only an example, and any suitable naming method may be adopted. For example, Mode-1 HARQ-ACK retransmission may be simply called "HARQ-ACK retransmission".

It may be specified by protocols and/or configured by higher layer signaling that the UE is indicated to trigger Mode-1 HARQ-ACK retransmission in a PUCCH by receiving a downlink DCI format. The UE does not expect a K1 field in the DCI format to indicate a non-numeric (or inapplicable) value (e.g., −1). The DCI format only indicates that a retransmission of HARQ-ACK information is transmitted in the PUCCH, but does not indicate that other HARQ-ACK information is transmitted in the PUCCH. For example, the DCI format does not schedule a PDSCH and/or does not indicate a SPS PDSCH release (deactivation) and/or does not indicate a secondary cell dormancy and/or does not indicate a Type-3 HARQ-ACK codebook transmission in 3GPP. The UE expects to provide the HARQ-ACK information after $N\_1$ symbols after (e.g., immediately after) a last symbol of a PDCCH carrying the DCI format. For example, $N\_1$ may be determined by a timing relationship defined by 3GPP between receiving of a DCI format indicating release (deactivation) of a SPS PDSCH and feeding back of HARQ-ACK information for the DCI format. By a capability report, the UE may also report whether it supports a DCI format that triggers a Mode-1 HARQ-ACK retransmission and at the same time, schedules a PDSCH and/or indicates a SPS PDSCH release (deactivation) and/or indicates a secondary cell dormancy and/or indicates a Type-3 HARQ-ACK codebook transmission in 3GPP. The method is simple to implement and the HARQ-ACK does not need to be multiplexed with other HARQ-ACK scheduled by the DCI format. In addition, by reusing the existing implementation methods, the UE implementation complexity can be reduced.

It may be specified by protocols and/or configured by higher layer signaling that at least one of one or more fields in a DCI format is reserved, and/or the DCI format does not include the at least one of the one or more fields, and/or the DCI format reuses the at least one of the one or more fields, to indicate offset1 and/or offset2. The one or more fields include, for example:

a frequency domain resource assignment (FDRA)
an MCS
a HARQ process number (HPN)
antenna port(s)

For example, the MCS field and/or FDRA field may be reused for indicating offset1 and/or offset2. These two fields have a large number of bits, which can increase the flexibility of indication.

By reusing the existing fields in the DCI format, the method can reduce the size of the DCI format, thereby improving the spectrum efficiency. In addition, the method can also reduce the implementation complexity of the UE.

It may be specified by protocols and/or configured by higher layer signaling that retransmissions of HARQ-ACK information (or HARQ-ACK codebooks) of one or more UEs may be triggered by a group common DCI format. For example, UEs in a group may be respectively indicated whether to retransmit HARQ-ACK, and/or offset1, and/or offset2, and/or a PUCCH resource indicator (PRI), and/or a transmit power control (TPC) indication. The method can reduce the DCI overhead and improve the spectrum efficiency.

It may be indicated by a new field in a DCI format that whether a HARQ-ACK retransmission and offset1 and/or offset2 are indicated. The HARQ-ACK retransmission and offset1 and/or offset2 may be indicated by different fields separately, or the HARQ-ACK retransmission and offset1 and/or offset2 may be jointly indicated by one field. For example, a codeword is used for indicating that the HARQ-ACK retransmission is not triggered, and other codewords are used for indicating different values of offset1 and/or offset2 corresponding to the triggering of the HARQ-ACK retransmission. In a specific example, in the case of using, for example, two bits to indicate jointly, "00" may indicate that the HARQ-ACK retransmission is not triggered, and "01", "10" and "11" may respectively indicate three values of offset1 and/or offset2 and that the DCI triggers the HARQ-ACK retransmission. When two bits are used for indicating different fields, the two bits may only indicate two values of offset1 and/or offset2 at most. In contrast, the joint indication method can improve the scheduling flexibility when the number of indication bits is the same. For example, if the number of possible values of different offset1 and/or offset2 is K, the joint indication may be realized by $\lceil \log_2 (K+1) \rceil$ bits. The method can improve the scheduling flexibility.

The UE may support multiple retransmission methods of HARQ-ACK. For example, the UE may be configured with an enhanced dynamic HARQ-ACK codebook (e.g., the UE is configured with the 3GPP parameter pdsch-HARQ-ACK-Codebook-r16; the parameter may be configured as enhancedDynamic). For example, the UE may be configured with a Mode-1 HARQ-ACK retransmission as described above. If multiple retransmission modes are supported at the same time, the implementation complexity of the UE will increase. In addition, it may also be required to specify by protocols how the UE generates a HARQ-ACK codebook when the multiple retransmission modes are triggered simultaneously. It may be specified by protocols that UE does not expect to be configured with an enhanced dynamic HARQ-ACK codebook and a Mode-1 HARQ-ACK retransmission at the same time. It may be specified by protocols that UE does not expect to be configured with a Type-3 HARQ-ACK codebook (including the enhanced Type-3 HARQ-ACK codebook) in 3GPP and a Mode-1 HARQ-ACK retransmission at the same time and/or that a Type-3 HARQ-ACK codebook (including the enhanced Type-3 HARQ-ACK codebook) in 3GPP and a Mode-1 HARQ-ACK retransmission are triggered at the same time. The method is simple to implement, and can reduce the implementation complexity of the base station and the UE.

It may be specified by protocols and/or configured by higher layer signaling that a DCI format that triggers a Mode-1 HARQ-ACK retransmission and/or a DCI format that triggers a Type-3 HARQ-ACK codebook (including an enhanced Type-3 HARQ-ACK codebook) in 3GPP may be scrambled by at least one of:

a C-RNTI
a CS-RNTI
an MC S-C-RNTI
a G-RNTI
a G-CS-RNTI

The method provides a variety of RNTIs available for scrambling, which can increase the scheduling flexibility.

It may be specified by protocols and/or configured by higher layer signaling that a DCI format that triggers a Mode-1 HARQ-ACK retransmission may or may not schedule a PDSCH. Whether the DCI format schedules a PDSCH may be determined by, for example, a FDRA field in the DCI format. For example, it may be specified by protocols that, when at least one of the following conditions is met, the DCI format triggers the Mode-1 HARQ-ACK retransmission and does not schedule the PDSCH:

The UE detects the DCI format indicating to trigger a Mode-1 HARQ-ACK retransmission;

The DCI format is scrambled by a C-RNTI or MCS-C-RNTI or G-RNTI;

The higher layer parameter resourceAllocation is configured as resourceAllocationType0 (that is, resourceAllocation=resourceAllocationType0) and all of the bits in a FDRA field in the DCI format are 0;

The higher layer parameter resourceAllocation is configured as resourceAllocationType1 (that is, resourceAllocation=resourceAllocationType1) and all of the bits in the FDRA field in the DCI format are 1;

The higher layer parameter resourceAllocation is configured as dynamicSwitch (that is, resourceAllocation=dynamicSwitch) and all of the bits in the FDRA field in the DCI format are 0 or 1.

The method can reduce the size of the DCI format, thereby improving spectrum efficiency.

It may be specified by protocols and/or configured by higher layer signaling that only one DCI format may be allowed to trigger transmission of a Mode-1 HARQ-ACK retransmission in a PUCCH. For example, the UE does not expect to receive more than one DCI format triggering a retransmission (e.g., Mode-1 HARQ-ACK retransmission) of HARQ-ACK information (HARQ-ACK codebook) carried by a same (or different) PUCCH in another PUCCH (or slot) and/or PUSCH. The method is simple to implement, avoids the multiplexing of a plurality of HARQ-ACK codebooks in a PUCCH for transmission, and can reduce the implementation complexity of the base station and the UE.

It may be specified by protocols and/or configured by higher layer signaling that a DCI format may only be allowed to trigger a retransmission (e.g., Mode-1 HARQ-ACK retransmission) of initially transmitted HARQ-ACK information (HARQ-ACK codebook). For example, the UE does not expect to receive a DCI format triggering a retransmission (e.g., Mode-1 HARQ-ACK retransmission) of retransmitted HARQ-ACK information (HARQ-ACK codebook) in another PUCCH (or slot) and/or PUSCH. For example, the UE does not expect to receive a DCI format triggering a retransmission (e.g., Mode-1 HARQ-ACK retransmission) of a PUCCH (or slot) with the retransmitted HARQ-ACK information (HARQ-ACK codebook) in another PUCCH (or slot) and/or PUSCH. The method is simple to implement, and can reduce the implementation complexity of the base station and the UE. The method avoids triggering the retransmitted HARQ-ACK codebook, and thus can improve the consistency of the understanding of the HARQ-ACK codebook between the base station and the UE, and improve the reliability of the HARQ-ACK transmission.

It may be specified by protocols and/or configured by higher layer signaling that a retransmission (e.g., Mode-1 HARQ-ACK retransmission) of HARQ-ACK is not allowed to be multiplexed with other HARQ-ACK information (e.g., HARQ-ACK information for a dynamically scheduled PDSCH and/or HARQ-ACK information for a SPS PDSCH) in a PUCCH. For example, the UE does not expect to receive a DCI format triggering multiplexing of a retransmission of HARQ-ACK information (HARQ-ACK codebook) with other HARQ-ACK information in a same PUCCH. For example, the UE does not expect to receive a DCI format triggering a retransmission of HARQ-ACK information (HARQ-ACK codebook) to be multiplexed with HARQ-ACK information scheduled by other DCI formats and/or the HARQ-ACK information for a SPS PDSCH in a same PUCCH. The method is simple to implement, avoids the multiplexing of a plurality of HARQ-ACK codebooks in a PUCCH for transmission, and can reduce the implementation complexity of the base station and the UE.

It may be specified by protocols and/or configured by higher layer signaling that a PUCCH (or slot) carrying a retransmission (e.g., Mode-1 HARQ-ACK retransmission) of HARQ-ACK may not be allowed to be earlier than (and/or equal to) a PUCCH (or slot) carrying an initial transmission of the HARQ-ACK. As an example, the UE does not expect to receive a DCI format triggering a PUCCH (or slot) carrying a retransmission of HARQ-ACK information (HARQ-ACK codebook) earlier than (and/or equal to) a PUCCH (or slot) carrying an initial transmission of the HARQ-ACK. As another example, the UE does not expect to receive a DCI format triggering a PUCCH carrying HARQ-ACK information (HARQ-ACK codebook) of which the starting (or end) symbol (or position) is earlier than (and/or equal to) the starting (or end) symbol (or position) of a PUCCH carrying an initial transmission of the HARQ-ACK. For example, if offset1 indicates a time interval between the PUCCH carrying the retransmitted HARQ-ACK and the PUCCH carrying the initially transmitted HARQ-ACK, a value of offset1 may be configured as a positive integer (or a non-negative integer). As another example, if offset1 indicates a time interval between a PUCCH carrying the initially transmitted HARQ-ACK and a PUCCH carrying the retransmitted HARQ-ACK, a configurable value of offset1 may be negative integer and/or 0. The method may avoid the problem of out-of-order (OOO) scheduling and reduce the implementation complexity of the UE. If the protocols allow a PUCCH (or slot) carrying a retransmission of HARQ-ACK (for example, Mode-1 HARQ-ACK retransmission) to be earlier than (and/or equal to) a PUCCH (or slot) carrying an initial transmission of the HARQ-ACK. The PUCCH carrying the retransmission of the HARQ-ACK (for example, Mode-1 HARQ-ACK retransmission) may also need to meet the constraints of OOO scheduling. That is, a transmission time of HARQ-ACK for a first scheduled PDSCH cannot be later than that of HARQ-ACK for a later scheduled PDSCH.

It may be specified by protocols and/or configured by higher layer signaling that more than one DCI format may be allowed to trigger transmission of a retransmission (e.g., Mode-1 HARQ-ACK retransmission) of HARQ-ACK information (HARQ-ACK codebook) carried by a same PUCCH (or in slot) in a PUCCH. For example, when the UE receives at least one DCI format triggering the retransmission (for example, Mode-1 HARQ-ACK retransmission) of the HARQ-ACK information (HARQ-ACK codebook) in a PUCCH, the UE transmits the retransmission of the HARQ-ACK in the PUCCH. For example, the UE does not expect that indications of the Mode-1 HARQ-ACK retransmission indicating a transmission of HARQ-ACK in a same PUCCH in multiple DCI formats that are received in a same PDCCH MO are different. That is, all of the DCI indicate that the Mode-1 HARQ-ACK retransmission is triggered or all of the DCI indicate that the Mode-1 HARQ-ACK retransmission is not triggered. For example, when the UE receives a DCI format in a first PDCCH MO to trigger a retransmission (e.g., Mode-1 HARQ-ACK retransmission) of HARQ-ACK information (HARQ-ACK codebook) in a PUCCH, the UE does not expect to receive a DCI format in a second PDCCH MO that does not trigger the retransmission of the HARQ-ACK information (HARQ-ACK codebook) in the PUCCH. The method clarifies the behavior of the UE, ensures the consistency of the understanding of the triggering between the UE and the base station, and improves the reliability of the HARQ-ACK transmission.

It may be specified by protocols and/or configured by higher layer signaling that a DCI format may be allowed to trigger a retransmission (e.g., Mode-1 HARQ-ACK retransmission) of retransmitted HARQ-ACK information (HARQ-ACK codebook). In this case, a maximum time interval Kmax from a PUCCH carrying a retransmission of HARQ-ACK to a PUCCH carrying an initial transmission of the HARQ-ACK may be configured by higher layer signaling. For example, the UE does not expect to receive a DCI format triggering a retransmission of HARQ-ACK, where a time interval from a PUCCH carrying the retransmission of the HARQ-ACK (e.g., the retransmission of the HARQ-ACK may be a retransmission of a retransmission of the HARQ-ACK) to a PUCCH carrying an initial transmission of the HARQ-ACK exceeds Kmax. The method clarifies the behavior of the UE, ensures the consistency of the understanding of the triggering between the UE and the base station, and improves the reliability of the HARQ-ACK transmission.

It may be specified by protocols and/or configured by higher layer signaling that a retransmission of HARQ-ACK (e.g., Mode-1 HARQ-ACK retransmission) may be allowed to be multiplexed with other HARQ-ACK information (e.g., HARQ-ACK information for a dynamically scheduled PDSCH and/or HARQ-ACK information for a SPS PDSCH) in a PUCCH. HARQ-ACK information initially transmitted in the PUCCH may constitute a first HARQ-ACK sub-codebook, and HARQ-ACK information retransmitted in the PUCCH may constitute a second HARQ-ACK sub-codebook. A HARQ-ACK codebook transmitted in the PUCCH consists of the first HARQ-ACK sub-codebook and the second HARQ-ACK sub-codebook. The first HARQ-ACK sub-codebook may be located before or after the second HARQ-ACK sub-codebook. The method clarifies the behavior of the UE, ensures the consistency of the understanding of the triggering between the UE and the base station, and improves the reliability of the HARQ-ACK transmission.

It may be specified by protocols and/or configured by higher layer signaling that more than one DCI format may be allowed to trigger a retransmission (e.g., Mode-1 HARQ-ACK retransmission) of different HARQ-ACK information (HARQ-ACK codebooks) carried by different PUCCHs (or slots) in a same PUCCH. HARQ-ACK information initially transmitted in the same PUCCH may constitute a first HARQ-ACK sub-codebook, and HARQ-ACK information retransmitted in the same PUCCH may constitute a second HARQ-ACK sub-codebook. A HARQ-ACK codebook transmitted in the same PUCCH consists of the first HARQ-ACK sub-codebook and the second HARQ-ACK sub-codebook. The first HARQ-ACK sub-codebook may be located before or after the second HARQ-ACK sub-codebook. The second HARQ-ACK sub-codebook may include one or more HARQ-ACK sub-sub-codebooks. Each of the HARQ-ACK sub-sub-codebooks corresponds to an initially transmitted HARQ-ACK codebook carried by a PUCCH (or in a slot), and a HARQ-ACK retransmission of the initially transmitted HARQ-ACK codebook is transmitted in the same PUCCH. The HARQ-ACK sub-sub-codebooks may be sorted in chronological order. The method clarifies the behavior of the UE, ensures the consistency of the understanding of the triggering between the UE and the base station, and improves the reliability of the HARQ-ACK transmission.

The UE may be configured with a semi-static HARQ-ACK codebook or a dynamic HARQ-ACK codebook. In this case, how to determine a HARQ-ACK codebook of HARQ-ACK information triggered to be retransmitted needs to be considered.

The UE may be configured with a semi-static HARQ-ACK codebook. At present, for the semi-static HARQ-ACK codebook (Type-1 HARQ-ACK codebook) in 3GPP, downlink slots included in the HARQ-ACK codebook may be determined according to possible values of the timing value K1. The possible values of K1 may be the union of sets of K1 indicated by available downlink DCI format(s). For example, if the set of K1 is {1, 2, 3, 4}, the HARQ-ACK codebook in slot n needs to include HARQ-ACK information for possible PDSCHs in slots n-4, n-3, n-2 and n-1. If the slot interval offset1 from PUCCH #2 to PUCCH #1 in FIG. 7 is equal to 2, the Type-1 HARQ-ACK codebook in PUCCH #2 cannot completely include the Type-1 HARQ-ACK codebook in PUCCH #1. To solve this problem, one of the following two manners may be adopted. In one manner, the corresponding Type-1 HARQ-ACK codebooks in PUCCH #1 and PUCCH #2 are stitched to form a new HARQ-ACK codebook. Referring to FIG. 7, since slot #1 and slot #2 are included in the corresponding Type-1 HARQ-ACK codebooks of PUCCH #1 and PUCCH #2, there will be redundant bits in the HARQ-ACK codebooks. In another manner, the set of K1 is extended, and the extended set of K1 may include values indicating downlink slots corresponding to a Type-1 HARQ-ACK codebook triggered to be retransmitted and downlink slots corresponding to a Type-1 HARQ-ACK codebook in a PUCCH indicated by a DCI format (the DCI format may be the above-mentioned DCI format or another DCI format). In this example, the set of K1 is extended to {1, 2, 3, 4, 5, 6}. Example extension methods may include adding offset1 (e.g., 2) to elements in the set of K1 (e.g., {1, 2, 3, 4}) to obtain a set (e.g., {3, 4, 5, 6}) and then taking the union of the set (e.g., {3, 4, 5, 6}) and the original set of K1 (e.g., {1, 2, 3, 4}) as the extended set of K1. The UE generates a Type-1 HARQ-ACK codebook according to the extended set of K1. The method may reduce the number of the HARQ-ACK bits, improve the reliability of the HARQ-ACK transmission and improve the spectrum efficiency of the system.

The UE may be configured with a semi-static HARQ-ACK codebook. If a HARQ-ACK codebook triggered to be retransmitted only includes HARQ-ACK information for SPS PDSCHs, the HARQ-ACK codebook may be placed after (or before) the Type-1 HARQ-ACK codebook in an indicated PUCCH. Or, if the HARQ-ACK codebook triggered to be retransmitted only includes HARQ-ACK information for SPS PDSCHs, the HARQ-ACK information for SPS PDSCH(s) corresponding to the HARQ-ACK codebook that satisfy a predefined condition may be placed after (or before) the Type-1 HARQ-ACK codebook in the indicated PUCCH. The predefined condition may be that the SPS PDSCH is not included in any of downlink slots indicated by the set of K1 corresponding to the PUCCH. The method may reduce the number of bits of HARQ-ACK, improve the reliability of the HARQ-ACK transmission and improve the spectrum efficiency of the system.

Figure 9A:
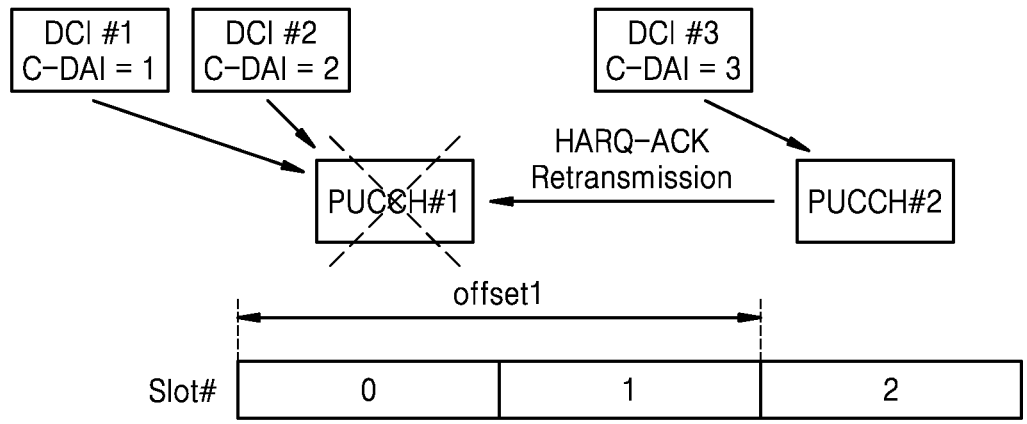
FIGS. 9A-9F are diagrams illustrating DAI counting for a dynamic HARQ-ACK codebook, according to an embodiment.

The UE may be configured with a dynamic HARQ-ACK codebook. It may be specified by protocols and/or configured by higher layer signaling that a DAI in a downlink DCI format indicating to trigger a retransmission of HARQ-ACK counts jointly with a DAI associated with the retransmitted HARQ-ACK information. For example, as shown in FIG. 9A, DCI #1 and DCI #2 each schedule a feedback of HARQ-ACK information for a PDSCH in PUCCH #1, and the C-DAI counts are 1 and 2, respectively. DCI #3 triggers a retransmission of the HARQ-ACK information carried by PUCCH #1 in PUCCH #2. DCI #3 schedules a PDSCH with a C-DAI count of 3. The UE generates a HARQ-ACK codebook according to the DAI of DCI #1, DCI #2 and DCI #3, for example, according to the method for Type-2 HARQ-ACK codebooks in a PUCCH in 3GPP. In this example, a PDSCH corresponds to 1-bit HARQ-ACK information, and the number of bits in the HARQ-ACK codebook is 3 bits. If the UE does not receive DCI #2, the UE may find a missed detection of DCI #2 according to DCI #3. The method can improve the reliability of HARQ-ACK codebook.

Figure 9B:
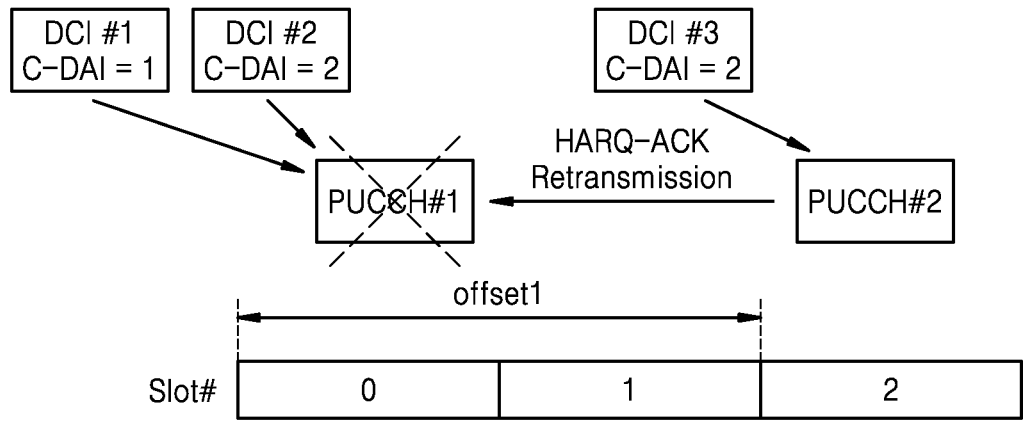

The UE may be configured with a dynamic HARQ-ACK codebook. It may be specified by protocols and/or configured by higher layer signaling that a DAI in a downlink DCI format indicating to trigger a retransmission of HARQ-ACK counts jointly with a DAI associated with the retransmitted HARQ-ACK. For example, as shown in FIG. 9B, DCI #1 and DCI #2 each schedule a feedback of HARQ information for a PDSCH in PUCCH #1, and the C-DAI counts are 1 and 2, respectively. DCI #3 triggers a retransmission of the HARQ-ACK carried by PUCCH #1 in PUCCH #2. DCI #3 does not schedule a PDSCH, and/or DCI #3 does not indicate other HARQ-ACK (e.g., for SPS release or secondary cell dormancy); the C-DAI count in DCI #3 is 2, and/or the T-DAI count in DCI #3 is 2. The UE generates a HARQ-ACK codebook according to the DAI of DCI #1, DCI #2 and DCI #3. The UE generates the HARQ-ACK codebook according to the method for Type-2 HARQ-ACK codebooks in a PUSCH in 3GPP, where the C-DAI and/or T-DAI in DCI #3 may replace the UL DAI. In this example, a PDSCH corresponds to 1-bit HARQ-ACK information, and the number of bits in the HARQ-ACK codebook is 2 bits. If the UE does not receive DCI #2, the UE may find a missed detection of DCI #2 according to DCI #3. The method can improve the reliability of the HARQ-ACK codebook.

Figure 9C:
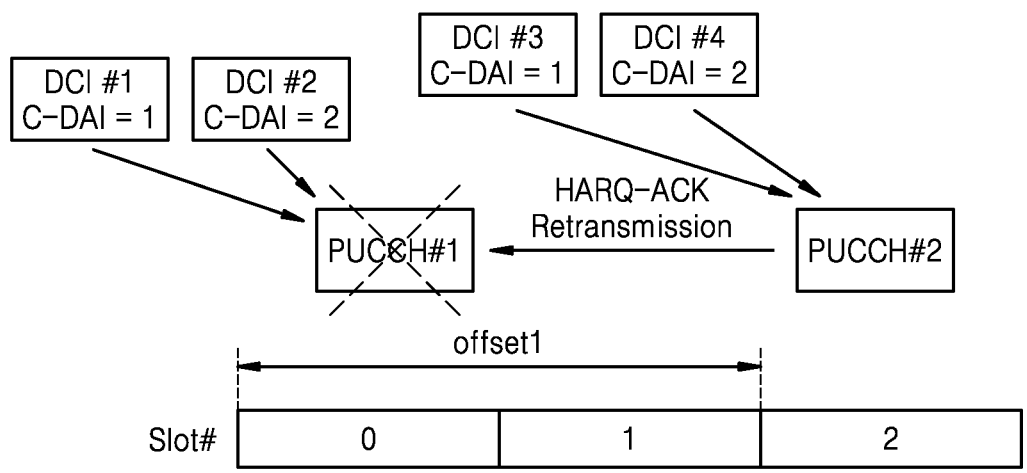

The UE may be configured with a dynamic HARQ-ACK codebook. It may be specified by protocols and/or configured by higher layer signaling that a DAI in a downlink DCI format indicating to trigger a retransmission of HARQ-ACK counts separately with a DAI associated with the retransmitted HARQ-ACK. For example, as shown in FIG. 9C, DCI #1 and DCI #2 each schedule a feedback of HARQ information for a PDSCH in PUCCH #1, and the C-DAI counts are 1 and 2, respectively. DCI #4 triggers a retransmission of the HARQ-ACK carried by PUCCH #1 in PUCCH #2. DCI #3 and DCI #4 each schedule a feedback of HARQ information for a PDSCH in PUCCH #2, and the C-DAI counts are 1 and 2, respectively. The UE generates a retransmitted HARQ-ACK sub-codebook according to DCI #1 and DCI #2, and the UE generates an initially transmitted HARQ-ACK sub-codebook according to DCI #1 and DCI #2. For example, the HARQ-ACK sub-codebook is generated according to the method for Type-2 HARQ-ACK codebooks in a PUCCH in 3GPP. The HARQ-ACK codebook consists of the retransmitted HARQ-ACK sub-codebook and the initially transmitted HARQ-ACK sub-codebook. If the UE does not receive DCI #3, the UE may find a missed detection of DCI #3 according to DCI #4. The method can improve the reliability of HARQ-ACK codebook.

Figure 9D:
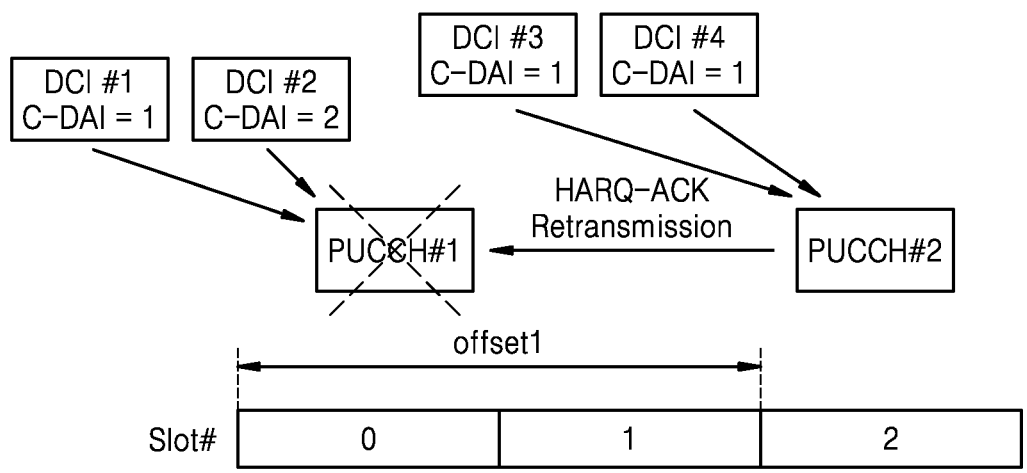

The UE may be configured with a dynamic HARQ-ACK codebook. It may be specified by protocols and/or configured by higher layer signaling that a DAI in a downlink DCI format indicating to trigger a retransmission of HARQ-ACK counts separately with a DAI associated with the retransmitted HARQ-ACK. For example, as shown in FIG. 9D, DCI #1 and DCI #2 each schedule a feedback of HARQ information for a PDSCH in PUCCH #1, and the C-DAI counts are 1 and 2, respectively. DCI #4 triggers a retransmission of the HARQ-ACK carried by PUCCH #1 in PUCCH #2. DCI #3 schedules a feedback of HARQ information for a PDSCH in PUCCH #2, and the C-DAI count is 1. DCI #4 does not schedule a PDSCH, and/or DCI #4 does not indicate other HARQ-ACK (e.g., for SPS release or secondary cell dormancy), and the C-DAI count in DCI #4 is 1, and/or the T-DAI count in DCI #4 is 1. The UE generates a retransmitted HARQ-ACK sub-codebook according to DCI #1 and DCI #2, and the UE generates an initially transmitted HARQ-ACK sub-codebook according to DCI #3 and DCI #4. For example, the initially transmitted HARQ-ACK sub-codebook is generated according to the method for Type-2 HARQ-ACK codebooks in a PUSCH in 3GPP, where the C-DAI and/or T-DAI in DCI #4 may replace the UL DAI. The HARQ-ACK codebook consists of the retransmitted HARQ-ACK sub-codebook and the initially transmitted HARQ-ACK sub-codebook. If the UE does not receive DCI #3, the UE may find a missed detection of DCI #3 according to DCI #4. The method can improve the reliability of the HARQ-ACK codebook.

Figure 9E:
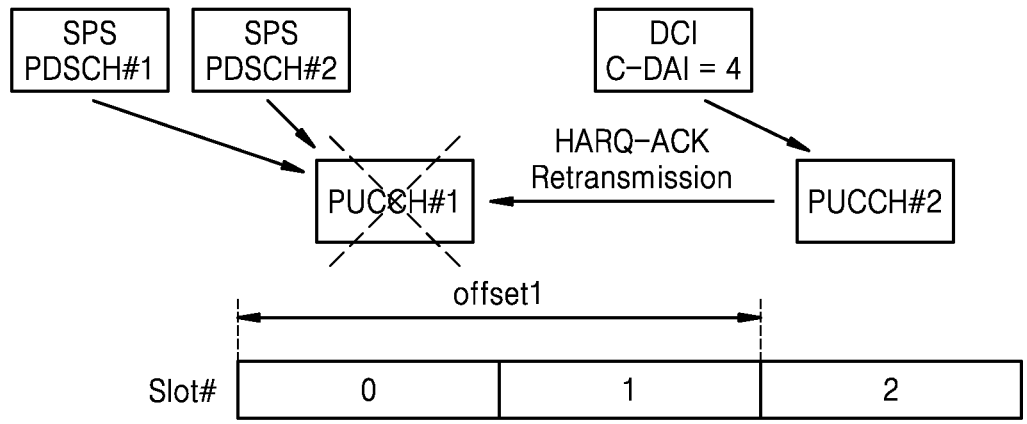

The UE may be configured with a dynamic HARQ-ACK codebook. It may be specified by protocols and/or configured by higher layer signaling that a DAI in a downlink DCI format indicating to trigger a retransmission of HARQ-ACK count jointly or separately with a DAI associated with the retransmitted HARQ-ACK. For example, as shown in FIG. 9E, a feedback for SPS PDSCH #1 and a feedback for SPS PDSCH #2 are in PUCCH #1. DCI triggers a retransmission of the HARQ-ACK carried by PUCCH #1 in PUCCH #2. DCI #3 does not schedule a PDSCH, and/or DCI #3 does not indicate other HARQ-ACK (for example, for SPS release or secondary cell dormancy). As shown in Tables 1 and 2, the DAI count cannot directly indicate 0. In this case, a predefined rule may be used to define how the DAI indicates 0 and/or the UE does not generate a dynamically scheduled HARQ-ACK codebook (or sub-codebook) (for example, HARQ-ACK information scheduled (or indicated) by a DCI format). The predefined rule may be at least one of the following:

A value indicated by the DAI is a specific value (e.g., 4);

The UE does not receive any DCI scheduling (or indicating) a transmission of the HARQ-ACK in a slot where a retransmitted PUCCH (PUCCH carrying the HARQ-ACK) is located;

The UE does not receive any DCI scheduling (or indicating) a transmission of the HARQ-ACK (excluding the triggered HARQ-ACK retransmission) in a slot where a PUCCH that retransmits the HARQ-ACK is located.

Figure 9F:
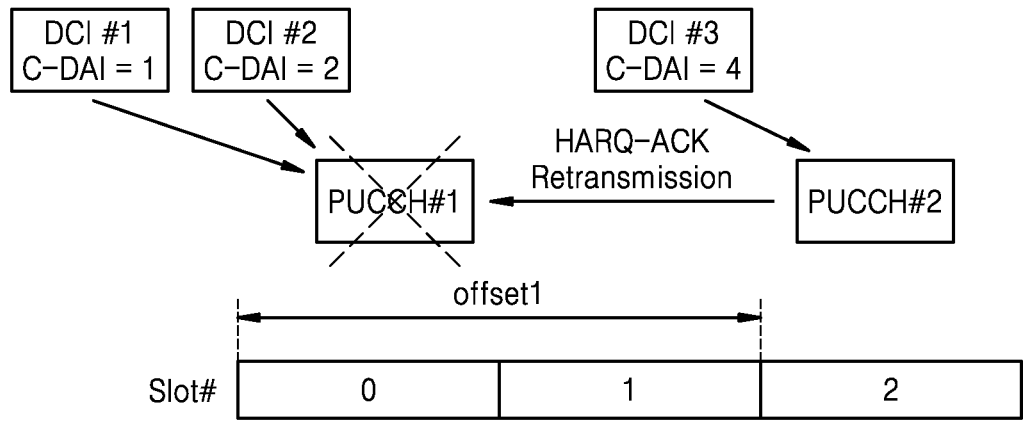

In another example, the UE may be configured with a dynamic HARQ-ACK codebook. It may be specified by protocols and/or configured by higher layer signaling that a DAI in a downlink DCI format indicating to trigger a retransmission of HARQ-ACK counts separately with a DAI associated with the retransmitted HARQ-ACK. For example, as shown in FIG. 9F, DCI #1 and DCI #2 each schedule a feedback of HARQ information for a PDSCH in PUCCH #1, and the C-DAI counts are 1 and 2, respectively. DCI #3 triggers a retransmission of the HARQ-ACK carried by PUCCH #1 in PUCCH #2. DCI #3 does not schedule a PDSCH. It may indicate that DAI is 0 based on the above-mentioned predefined rule, and the UE may not generate HARQ-ACK information for a DCI format (e.g., DCI #3) without scheduling PDSCHs.

The method defines a method in which a dynamic HARQ-ACK codebook/sub-codebook is not generated, which can reduce the UCI overhead, improve the transmission reliability and improve the system spectrum efficiency.

The UE may be configured with a dynamic HARQ-ACK codebook. It may be specified by protocols and/or configured by higher layer signaling that a DAI (e.g., a total DAI) of HARQ-ACK triggered to be retransmitted may be indicated by a specific DAI field (e.g., a newly added DAI field) in a DCI format (the DCI format may be a downlink DCI format and/or a downlink DCI format). The method can improve the reliability of HARQ-ACK codebook.

The UE may be configured with a dynamic HARQ-ACK codebook. It may be specified by protocols and/or configured by higher layer signaling that a C-DAI in a downlink DCI format indicating to trigger a retransmission of HARQ-ACK counts separately with a DAI associated with the retransmitted HARQ-ACK. A DAI (e.g., a total DAI) of the HARQ-ACK triggered to be retransmitted is indicated by a T-DAI field in a downlink DCI format. The method can improve the reliability of HARQ-ACK codebook.

The UE is configured with a dynamic HARQ-ACK codebook. The UE is configured with a CBG (code block group)-based HARQ-ACK feedback. It may be specified by protocols and/or configured by higher layer signaling that, if a DCI format indicating to trigger a retransmission of HARQ-ACK schedules a TB (transport block)-based PDSCH reception, a DAI indication in the DCI format is determined as a DAI indication corresponding to a TB-based HARQ-ACK sub-codebook, for example, according to the method of other embodiments of the disclosure. If a DCI format indicating to trigger a retransmission of HARQ-ACK schedules a CBG-based PDSCH reception, a DAI indication in the DCI format is determined as a DAI indication corresponding to a CBG-based HARQ-ACK sub-codebook, for example, according to the method of other embodiments of the disclosure. The method reduces the DCI overhead and can improve the spectrum efficiency of the system.

Figure 10:
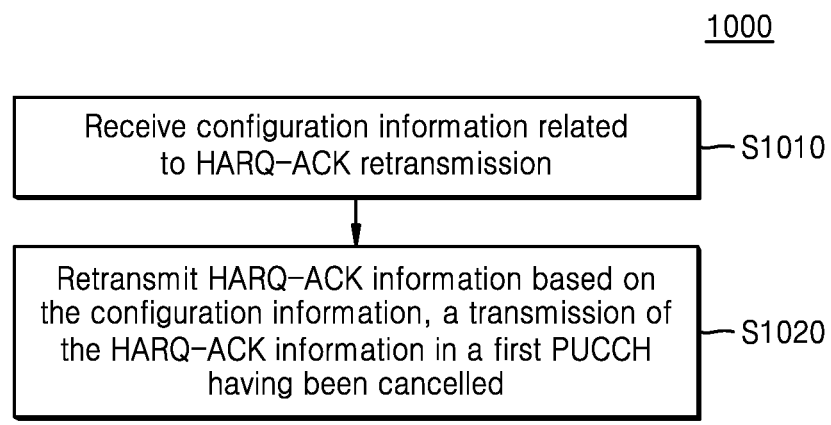
FIG. 10 is a flowchart illustrating a method performed by a terminal, according to an embodiment.

FIG. 10 is a flowchart illustrating a method performed by a terminal, according to an embodiment.

With reference to FIG. 10, at S1010, configuration information related to HARQ-ACK retransmission is received from a base station.

At S1020, HARQ-ACK information of which a transmission in a first PUCCH has been cancelled is retransmitted based on the configuration information. For example, S1020 may include determining (e.g., identifying) the HARQ-ACK information of which the transmission in the first PUCCH has been cancelled and retransmitting the identified HARQ-ACK information based on the configuration information.

For example, the above operations or other operations in the method 1000 may be implemented with reference to one or more previously described embodiments.

For example, the method 1000 may include one or more of the operations performed by a terminal (e.g., UE) described in various embodiments of the disclosure.

Figure 11:
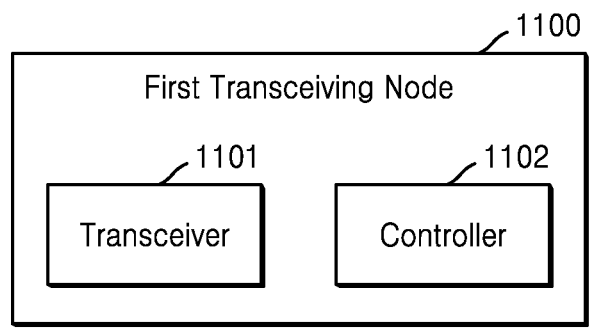
FIG. 11 is a diagram illustrating a first transceiver node, according to an embodiment.

FIG. 11 is diagram illustrating a first transceiver node, according to an embodiment.

Referring to FIG. 11, a first transceiver node 1100 includes a transceiver 1101 and a controller 1102.

The transceiver 1101 may be configured to transmit first data and/or first control signaling to a second transceiver node and receive second data and/or second control signaling from the second transceiver node in a time unit.

The controller 1102 may be an application specific integrated circuit or at least one processor. The controller 1102 may be configured to control the overall operation of the first transceiver node, including controlling the transceiver 1101 to transmit the first data and/or the first control signaling to the second transceiver node and to receive the second data and/or the second control signaling from the second transceiver node in the time unit.

The controller 1102 may be configured to perform one or more operations in the methods described above.

In the following description, the first transceiver node is illustrated by taking the base station as an example (but is not limited thereto), and the second transceiver node is illustrated by taking the UE as an example (but is not limited thereto). The downlink data and/or downlink control signaling (but is not limited thereto) are used to illustrate the first data and/or the first control signaling. The HARQ-ACK codebook may be included in the second control signaling, which is illustrated by the uplink control signaling (but is not limited thereto).

Figure 12:
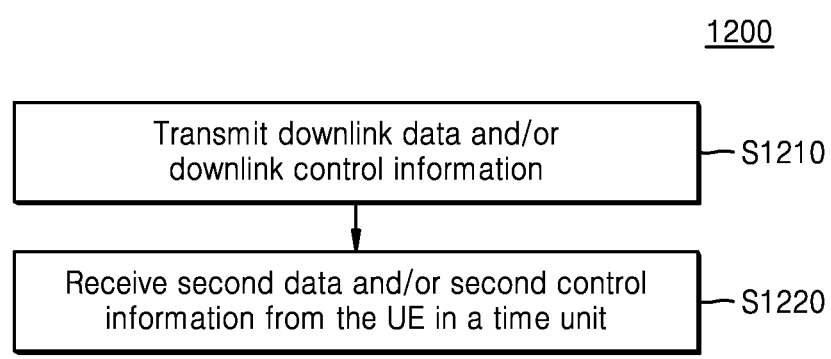
FIG. 12 is a diagram illustrating a first transceiver node, according to an embodiment.

FIG. 12 is a flowchart of a method performed by a base station, according to an embodiment.

Referring to FIG. 12, at S1210, the base station transmits downlink data and/or downlink control information.

At S1220, the base station receives second data and/or second control information from the UE in a time unit.

For example, method 1200 may include one or more of the operations performed by the base station described in various embodiments of the disclosure.

A downlink channel may include a PDCCH and/or a PDSCH. An uplink channel may include a PUCCH and/or a PUSCH.

Figure 13:
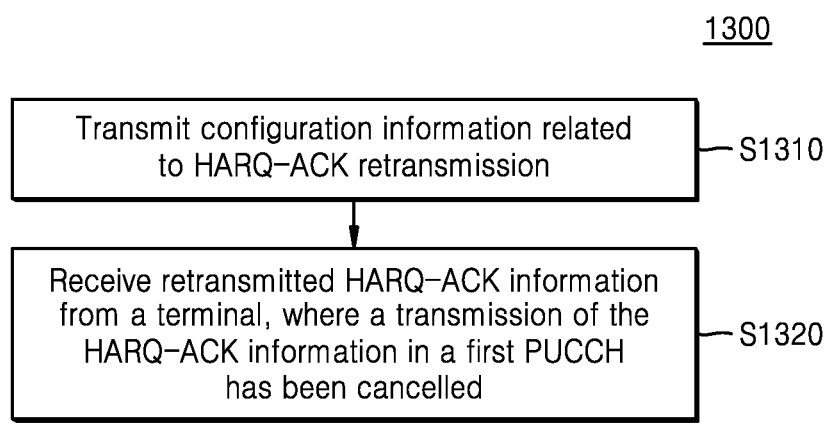
FIG. 13 is a flowchart illustrating a method performed by a base station, according to an embodiment.

FIG. 13 is a flowchart of a method performed by a base station, according to an embodiment.

With reference to FIG. 13, at S1310, configuration information related to HARQ-ACK retransmission is transmitted to a terminal.

At S1320, retransmitted HARQ-ACK information is received from the terminal, where a transmission of the HARQ-ACK information in a first PUCCH is cancelled, and the HARQ-ACK information is retransmitted based on the configuration information.

For example, the above operations in method 1300 or other operations may be implemented with reference to one or more of the previously described embodiments.

For example, the method 1300 may include one or more of the operations performed by the base station described in various embodiments of the disclosure.

Figure 14:
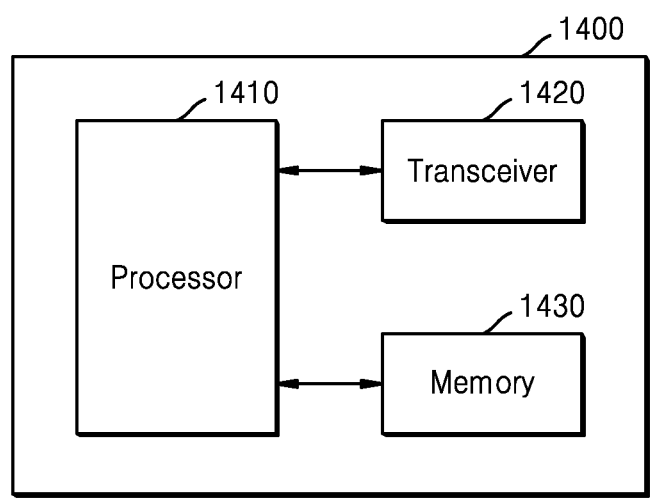
FIG. 14 is a diagram illustrating a UE, according to an embodiment.

FIG. 14 is a diagram illustrating a UE, according to an embodiment.

Referring to FIG. 14, a UE 1400 includes a processor 1410, a transceiver 1420, and a memory 1430. However, all of the illustrated components are not essential. The UE 1400 may be implemented by more or less components than those illustrated in FIG. 14. In addition, the processor 1410 and the transceiver 1420 and the memory 1430 may be implemented as a single chip according to another embodiment.

The processor 1410 may include one or more processors or other processing devices that control the proposed function, process, and/or method. Operation of the UE 1400 may be implemented by the processor 1410.

The transceiver 1420 may include a RF transmitter for up-converting and amplifying a transmitted signal, and a RF receiver for down-converting a frequency of a received signal. However, the transceiver 1420 may be implemented by more or less components than those illustrated in components.

The transceiver 1420 may be connected to the processor 1410 and transmit and/or receive a signal. The signal may include control information and data. In addition, the transceiver 1420 may receive the signal through a wireless channel and output the signal to the processor 1410. The transceiver 1420 may transmit a signal output from the processor 1410 through the wireless channel.

The memory 1430 may store the control information or the data included in a signal obtained by the UE 1400. The memory 1430 may be connected to the processor 1410 and store at least one instruction or a protocol or a parameter for the proposed function, process, and/or method. The memory 1430 may include ROM and/or RAM and/or hard disk and/or CD-ROM and/or DVD and/or other storage devices.

Figure 15:
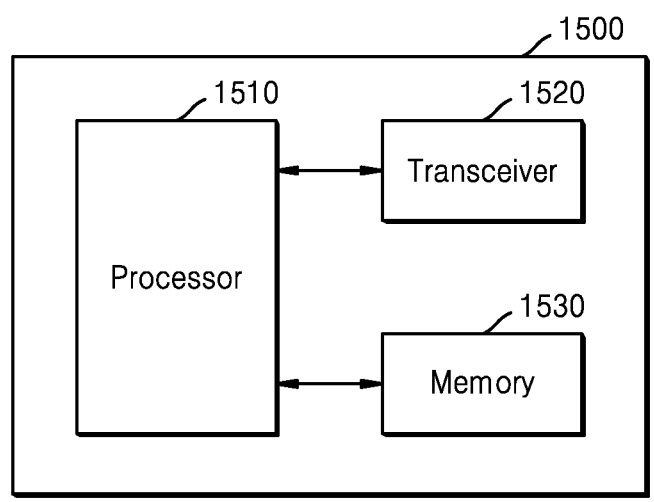
FIG. 15 is a diagram illustrating base station, according to an embodiment.

FIG. 15 is a diagram illustrating a base station, according to an embodiment.

Referring to the FIG. 15, a base station 1500 includes a processor 1510, a transceiver 1520 and a memory 1530. However, all of the illustrated components are not essential. The base station 1500 may be implemented by more or less components than those illustrated in FIG. 15. In addition, the processor 1510 and the transceiver 1520 and the memory 1530 may be implemented as a single chip according to another embodiment.

The processor 1510 may include one or more processors or other processing devices that control the proposed function, process, and/or method. Operation of the base station in this disclosure may be implemented by the processor 1510.

The transceiver 1520 may include a RF transmitter for up-converting and amplifying a transmitted signal, and a RF receiver for down-converting a frequency of a received signal.

However, the transceiver 1520 may be implemented by more or less components than those illustrated in components.

The transceiver 1520 may be connected to the processor 1510 and transmit and/or receive a signal. The signal may include control information and data. In addition, the transceiver 1520 may receive the signal through a wireless channel and output the signal to the processor 1510. The transceiver 1520 may transmit a signal output from the processor 1510 through the wireless channel.

The memory 1530 may store the control information or the data included in a signal obtained by the base station 1500. The memory 1530 may be connected to the processor 1510 and store at least one instruction or a protocol or a parameter for the proposed function, process, and/or method. The memory 1530 may include ROM and/or RAM and/or hard disk and/or CD-ROM and/or DVD and/or other storage devices.

The embodiments disclosed herein can be implemented through at least one software program running on at least one hardware device and performing network management functions to control the elements. The elements can be at least one of a hardware device, or a combination of hardware device and software module.

The foregoing description will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Those skilled in the art will understand that the above embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the embodiments as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a digital signal processor (DSP), an application specific integrated circuit (ASIC), a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents

What is claimed is:

1. A method performed by a user equipment (UE) in a wireless communication system, the method comprising:
   receiving, from a base station (BS), configuration information regarding a hybrid automatic repeat and request-acknowledgement (HARQ-ACK) retransmission via higher layer signaling;
   transmitting, to the BS, a first HARQ-ACK codebook, on a first slot;
   receiving, from the BS, a downlink control information (DCI);
   according to the configuration information, identifying an offset for the HARQ-ACK retransmission based on values of a modulation and coding scheme (MCS) field included in the DCI, wherein the offset indicates an interval between a slot carrying the DCI and the first slot; and
   retransmitting the first HARQ-ACK codebook, which is transmitted in the first slot, on a second slot.

2. The method of claim 1, wherein a cyclic redundancy check (CRC) of the DCI is scrambled by a cell-radio network temporary identifier (C-RNTI) or an MCS-cell-radio network temporary identifier (MCS-C-RNTI).

3. The method of claim 1, wherein retransmitting the HARQ-ACK code book on the second slot comprises:
   in case that the first HARQ-ACK codebook and a second HARQ-ACK codebook are multiplexed on the second slot, appending the first HARQ-ACK codebook to the second HARQ-ACK codebook.

4. The method of claim 1, wherein the second slot is after the first slot.

5. A method performed by a base station (BS) in a wireless communication system, the method comprising:
   transmitting, to a user equipment (UE), configuration information regarding a hybrid automatic repeat and request-acknowledgement (HARQ-ACK) retransmission via higher layer signaling;
   receiving, from the UE, a first HARQ-ACK codebook, on a first slot;
   transmitting, to the UE, a downlink control information (DCI) to the UE;
   according to the configuration information, identifying an offset for the HARQ-ACK retransmission based on values of a modulation and coding scheme (MCS) field included in the DCI, wherein the offset indicates an interval between a slot carrying the DCI and the first slot; and
   receiving the first HARQ-ACK codebook, which is received in the first slot, on a second slot.

6. The method of claim 5, wherein a cyclic redundancy check (CRC) of the DCI is scrambled by a cell-radio network temporary identifier (C-RNTI) or an MCS-cell-radio network temporary identifier (MCS-C-RNTI).

7. The method of claim 5, wherein, in case that the first HARQ-ACK codebook and a second HARQ-ACK codebook are multiplexed on the second slot, the first HARQ-ACK codebook is appended to the second HARQ-ACK codebook.

8. The method of claim 5, wherein the second slot is after the first slot.

9. A user equipment (UE) in a wireless communication system, the UE comprising:
   a transceiver; and
   a processor coupled with the transceiver and configured to:
      receive, from a base station (BS), configuration information regarding a hybrid automatic repeat and request-acknowledgement (HARQ-ACK) retransmission via higher layer signaling;
      transmit, to the BS, a first HARQ-ACK codebook, on a first slot;
      receive, from the BS, a downlink control information (DCI);
      according to the configuration information, identify an offset for the HARQ-ACK retransmission based on values of a modulation and coding scheme (MCS) field included in the DCI, wherein the offset indicates an interval between a slot carrying the DCI and the first slot; and
      transmit the first HARQ-ACK codebook, which is transmitted in the first slot, on a second slot.

10. The UE of claim 9, wherein a cyclic redundancy check (CRC) of the DCI is scrambled by a cell-radio network temporary identifier (C-RNTI) or an MCS-cell-radio network temporary identifier (MCS-C-RNTI).

11. The UE of claim 9, wherein the processor is further configured to:
   in case that the first HARQ-ACK codebook and a second HARQ-ACK codebook are multiplexed on the second slot, append the first HARQ-ACK codebook to the second HARQ-ACK codebook.

12. The UE of claim 9, wherein the second slot is after the first slot.

13. A base station (BS) in a wireless communication system, the BS comprising:
   a transceiver; and
   a processor coupled with the transceiver and configured to:
      transmit, to a user equipment (UE), configuration information regarding a hybrid automatic repeat and request-acknowledgement (HARQ-ACK) retransmission via higher layer signaling;
      receive, from the UE, first a HARQ-ACK codebook, on a first slot;
      transmit, to the UE, a downlink control information (DCI);
      according to the configuration information, identify an offset for the HARQ-ACK retransmission based on values of a modulation and coding scheme (MCS) field included in the DCI, wherein the offset indicates an interval between a slot carrying the DCI and the first slot; and
      receive the first HARQ-ACK codebook, which is received in the first slot, on a second slot.

14. The BS of claim 13, wherein a cyclic redundancy check (CRC) of the DCI is scrambled by a cell-radio network temporary identifier (C-RNTI) or an MCS-cell-radio network temporary identifier (MCS-C-RNTI).

15. The BS of claim 13, wherein, in case that the first HARQ-ACK codebook and a second HARQ-ACK codebook are multiplexed on the second slot, the first HARQ-ACK codebook is appended to the second HARQ-ACK codebook.

16. The BS of claim 13, wherein the second slot is after the first slot.

* * * * *